(12) United States Patent
Gillian et al.

(10) Patent No.: US 10,503,883 B1
(45) Date of Patent: Dec. 10, 2019

(54) RADAR-BASED AUTHENTICATION

(71) Applicant: Google Inc., Mountain View, CA (US)

(72) Inventors: Nicholas Edward Gillian, Palo Alto, CA (US); Ivan Poupyrev, Sunnyvale, CA (US); Carsten C. Schwesig, San Francisco, CA (US)

(73) Assignee: Google LLC, Mountain View, CA (US)

( * ) Notice: Subject to any disclaimer, the term of this patent is extended or adjusted under 35 U.S.C. 154(b) by 214 days.

(21) Appl. No.: 15/287,308

(22) Filed: Oct. 6, 2016

Related U.S. Application Data

(60) Provisional application No. 62/237,975, filed on Oct. 6, 2015.

(51) Int. Cl.
  *G06F 21/32* (2013.01)
  *G01S 7/41* (2006.01)
  *G01S 13/88* (2006.01)

(52) U.S. Cl.
  CPC .............. *G06F 21/32* (2013.01); *G01S 7/412* (2013.01); *G01S 13/88* (2013.01); *G06F 2221/2105* (2013.01)

(58) Field of Classification Search
  CPC .. G06F 21/32; G06F 2221/2105; G01S 7/412; G01S 13/88
  See application file for complete search history.

(56) References Cited

U.S. PATENT DOCUMENTS

| | | |
|---|---|---|
| 3,610,874 A | 10/1971 | Gagliano |
| 3,752,017 A | 8/1973 | Lloyd et al. |
| 3,953,706 A | 4/1976 | Harris et al. |
| 4,104,012 A | 8/1978 | Ferrante |
| 4,654,967 A | 4/1987 | Thenner |
| 4,700,044 A | 10/1987 | Hokanson et al. |
| 4,795,998 A | 1/1989 | Dunbar et al. |
| 4,838,797 A | 6/1989 | Dodier |
| 5,016,500 A | 5/1991 | Conrad et al. |
| 5,121,124 A | 6/1992 | Spivey et al. |
| 5,298,715 A | 3/1994 | Chalco et al. |
| 5,341,979 A | 8/1994 | Gupta |

(Continued)

FOREIGN PATENT DOCUMENTS

| | | |
|---|---|---|
| CN | 1462382 | 12/2003 |
| CN | 101751126 | 6/2010 |

(Continued)

OTHER PUBLICATIONS

S. Z. Gurbuz, W. L. Melvin, D. B. Williams "Detection and identification of human targets in radar data"—Proc. SPIE 6567, Signal Processing, Sensor Fusion, and Target Recognition XVI, 65670I (May 7, 2007) (Year: 2007).*

(Continued)

*Primary Examiner* — Catherine Thiaw
(74) *Attorney, Agent, or Firm* — Colby Nipper PLLC

(57) ABSTRACT

This document describes techniques and devices for radar-based authentication. The techniques describe a radar-based authentication component that is configured to recognize biometric characteristics associated with a person or gestures performed by the person. Then, by comparing the biometric characteristics or gestures with an authentication library, an authentication state may be determined which allows or restricts access to a device or application.

20 Claims, 10 Drawing Sheets

(56) References Cited

U.S. PATENT DOCUMENTS

| | | | |
|---|---|---|---|
| 5,410,471 A | 4/1995 | Alyfuku et al. | |
| 5,468,917 A | 11/1995 | Brodsky et al. | |
| 5,564,571 A | 10/1996 | Zanotti | |
| 5,656,798 A | 8/1997 | Kubo et al. | |
| 5,724,707 A | 3/1998 | Kirk et al. | |
| 5,798,798 A | 8/1998 | Rector et al. | |
| 6,032,450 A | 3/2000 | Blum | |
| 6,037,893 A | 3/2000 | Lipman | |
| 6,080,690 A | 6/2000 | Lebby et al. | |
| 6,101,431 A | 8/2000 | Niwa et al. | |
| 6,210,771 B1 | 4/2001 | Post et al. | |
| 6,254,544 B1 | 7/2001 | Hayashi | |
| 6,313,825 B1 | 11/2001 | Gilbert | |
| 6,340,979 B1 | 1/2002 | Beaton et al. | |
| 6,380,882 B1 | 4/2002 | Hegnauer | |
| 6,386,757 B1 | 5/2002 | Konno | |
| 6,440,593 B2 | 8/2002 | Ellison et al. | |
| 6,492,980 B2 | 12/2002 | Sandbach | |
| 6,493,933 B1 | 12/2002 | Post et al. | |
| 6,513,833 B2 | 2/2003 | Breed et al. | |
| 6,513,970 B1 | 2/2003 | Tabata et al. | |
| 6,524,239 B1 | 2/2003 | Reed et al. | |
| 6,543,668 B1 | 4/2003 | Fujii et al. | |
| 6,616,613 B1 | 9/2003 | Goodman | |
| 6,711,354 B2 | 3/2004 | Kameyama | |
| 6,717,065 B2 | 4/2004 | Hosaka et al. | |
| 6,802,720 B2 | 10/2004 | Weiss et al. | |
| 6,833,807 B2 | 12/2004 | Flacke et al. | |
| 6,835,898 B2 | 12/2004 | Eldridge et al. | |
| 6,854,985 B1 | 2/2005 | Weiss | |
| 6,929,484 B2 | 8/2005 | Weiss et al. | |
| 6,970,128 B1 | 11/2005 | Dwelly et al. | |
| 6,997,882 B1 | 2/2006 | Parker et al. | |
| 7,019,682 B1 * | 3/2006 | Louberg | G01S 7/03 342/175 |
| 7,134,879 B2 | 11/2006 | Sugimoto et al. | |
| 7,158,076 B2 | 1/2007 | Fiore et al. | |
| 7,164,820 B2 | 1/2007 | Eves et al. | |
| 7,194,371 B1 | 3/2007 | McBride et al. | |
| 7,205,932 B2 | 4/2007 | Fiore | |
| 7,223,105 B2 | 5/2007 | Weiss et al. | |
| 7,230,610 B2 | 6/2007 | Jung et al. | |
| 7,249,954 B2 | 7/2007 | Weiss | |
| 7,266,532 B2 | 9/2007 | Sutton et al. | |
| 7,299,964 B2 | 11/2007 | Jayaraman et al. | |
| 7,310,236 B2 | 12/2007 | Takahashi et al. | |
| 7,317,416 B2 | 1/2008 | Flom et al. | |
| 7,348,285 B2 | 3/2008 | Dhawan et al. | |
| 7,365,031 B2 | 4/2008 | Swallow et al. | |
| 7,421,061 B2 | 9/2008 | Boese et al. | |
| 7,462,035 B2 | 12/2008 | Lee et al. | |
| 7,528,082 B2 | 5/2009 | Krans et al. | |
| 7,544,627 B2 | 6/2009 | Tao et al. | |
| 7,578,195 B2 | 8/2009 | DeAngelis et al. | |
| 7,644,488 B2 | 1/2010 | Aisenbrey | |
| 7,647,093 B2 | 1/2010 | Bojovic et al. | |
| 7,670,144 B2 | 3/2010 | Ito et al. | |
| 7,677,729 B2 | 3/2010 | Vilser et al. | |
| 7,691,067 B2 | 4/2010 | Westbrook et al. | |
| 7,698,154 B2 | 4/2010 | Marchosky | |
| 7,791,700 B2 | 9/2010 | Bellamy | |
| 7,834,276 B2 | 11/2010 | Chou et al. | |
| 7,845,023 B2 | 12/2010 | Swatee | |
| 7,941,676 B2 | 5/2011 | Glaser | |
| 7,952,512 B1 | 5/2011 | Delker et al. | |
| 7,999,722 B2 | 8/2011 | Beeri et al. | |
| 8,062,220 B2 | 11/2011 | Kurtz et al. | |
| 8,063,815 B2 * | 11/2011 | Valo | G01S 7/412 342/179 |
| 8,169,404 B1 | 5/2012 | Boillot | |
| 8,179,604 B1 | 5/2012 | Prada Gomez et al. | |
| 8,193,929 B1 | 6/2012 | Siu et al. | |
| 8,199,104 B2 | 6/2012 | Park et al. | |
| 8,282,232 B2 | 10/2012 | Hsu et al. | |
| 8,289,185 B2 | 10/2012 | Alonso | |
| 8,301,232 B2 | 10/2012 | Albert et al. | |
| 8,314,732 B2 | 11/2012 | Oswald et al. | |
| 8,334,226 B2 | 12/2012 | Nhan et al. | |
| 8,341,762 B2 | 1/2013 | Balzano | |
| 8,344,949 B2 | 1/2013 | Moshfeghi | |
| 8,367,942 B2 | 2/2013 | Howell et al. | |
| 8,475,367 B1 | 7/2013 | Yuen et al. | |
| 8,505,474 B2 | 8/2013 | Kang et al. | |
| 8,509,882 B2 | 8/2013 | Albert et al. | |
| 8,514,221 B2 | 8/2013 | King et al. | |
| 8,527,146 B1 * | 9/2013 | Jackson | B60W 50/0098 180/273 |
| 8,549,829 B2 | 10/2013 | Song et al. | |
| 8,560,972 B2 | 10/2013 | Wilson | |
| 8,562,526 B2 | 10/2013 | Heneghan et al. | |
| 8,569,189 B2 | 10/2013 | Bhattacharya et al. | |
| 8,614,689 B2 | 12/2013 | Nishikawa et al. | |
| 8,655,004 B2 | 2/2014 | Prest et al. | |
| 8,700,137 B2 | 4/2014 | Albert | |
| 8,758,020 B2 | 6/2014 | Burdea et al. | |
| 8,759,713 B2 | 6/2014 | Sheats | |
| 8,764,651 B2 | 7/2014 | Tran | |
| 8,785,778 B2 | 7/2014 | Streeter et al. | |
| 8,790,257 B2 | 7/2014 | Libbus et al. | |
| 8,814,574 B2 | 8/2014 | Selby et al. | |
| 8,819,812 B1 | 8/2014 | Weber et al. | |
| 8,854,433 B1 | 10/2014 | Rafii | |
| 8,860,602 B2 | 10/2014 | Nohara et al. | |
| 8,921,473 B1 | 12/2014 | Hyman | |
| 8,948,839 B1 | 2/2015 | Longinotti-Buitoni et al. | |
| 9,055,879 B2 | 6/2015 | Selby et al. | |
| 9,075,429 B1 | 7/2015 | Karakotsios et al. | |
| 9,093,289 B2 | 7/2015 | Vicard et al. | |
| 9,125,456 B2 | 9/2015 | Chow | |
| 9,141,194 B1 | 9/2015 | Keyes et al. | |
| 9,148,949 B2 | 9/2015 | Zhou et al. | |
| 9,223,494 B1 | 12/2015 | Desalvo et al. | |
| 9,229,102 B1 | 1/2016 | Wright et al. | |
| 9,230,160 B1 | 1/2016 | Kanter | |
| 9,235,241 B2 | 1/2016 | Newham et al. | |
| 9,316,727 B2 | 4/2016 | Sentelle et al. | |
| 9,331,422 B2 | 5/2016 | Nazzaro et al. | |
| 9,335,825 B2 | 5/2016 | Rautiainen et al. | |
| 9,346,167 B2 | 5/2016 | O'Connor et al. | |
| 9,354,709 B1 | 5/2016 | Heller et al. | |
| 9,508,141 B2 | 11/2016 | Khachaturian et al. | |
| 9,569,001 B2 | 2/2017 | Mistry et al. | |
| 9,575,560 B2 | 2/2017 | Poupyrev et al. | |
| 9,588,625 B2 | 3/2017 | Poupyrev | |
| 9,594,443 B2 | 3/2017 | VanBlon et al. | |
| 9,600,080 B2 | 3/2017 | Poupyrev | |
| 9,693,592 B2 | 7/2017 | Robinson et al. | |
| 9,746,551 B2 | 8/2017 | Scholten et al. | |
| 9,766,742 B2 | 9/2017 | Papakostas | |
| 9,778,749 B2 | 10/2017 | Poupyrev | |
| 9,811,164 B2 | 11/2017 | Poupyrev | |
| 9,817,109 B2 | 11/2017 | Saboo et al. | |
| 9,837,760 B2 | 12/2017 | Karagozler et al. | |
| 9,848,780 B1 | 12/2017 | DeBusschere et al. | |
| 9,921,660 B2 | 3/2018 | Poupyrev | |
| 9,933,908 B2 | 4/2018 | Poupyrev | |
| 9,947,080 B2 | 4/2018 | Nguyen et al. | |
| 9,971,414 B2 | 5/2018 | Gollakota et al. | |
| 9,971,415 B2 | 5/2018 | Poupyrev et al. | |
| 9,983,747 B2 | 5/2018 | Poupyrev | |
| 9,994,233 B2 | 6/2018 | Diaz-Jimenez et al. | |
| 10,016,162 B1 | 7/2018 | Rogers et al. | |
| 10,034,630 B2 | 7/2018 | Lee et al. | |
| 10,073,590 B2 | 9/2018 | Dascola et al. | |
| 10,080,528 B2 | 9/2018 | DeBusschere et al. | |
| 10,082,950 B2 | 9/2018 | Lapp | |
| 10,088,908 B1 | 10/2018 | Poupyrev et al. | |
| 10,139,916 B2 | 11/2018 | Poupyrev | |
| 10,155,274 B2 | 12/2018 | Robinson et al. | |
| 10,175,781 B2 | 1/2019 | Karagozler et al. | |
| 10,203,763 B1 | 2/2019 | Poupyrev et al. | |
| 10,222,469 B1 | 3/2019 | Gillian et al. | |
| 10,241,581 B2 | 3/2019 | Lien et al. | |
| 10,268,321 B2 | 4/2019 | Poupyrev | |

(56) References Cited

U.S. PATENT DOCUMENTS

| | | |
|---|---|---|
| 10,285,456 B2 | 5/2019 | Poupyrev et al. |
| 10,300,370 B1 | 5/2019 | Amihood et al. |
| 10,310,620 B2 | 6/2019 | Lien et al. |
| 10,310,621 B1 | 6/2019 | Lien et al. |
| 10,379,621 B2 | 8/2019 | Schwesig et al. |
| 10,401,490 B2 | 9/2019 | Gillian et al. |
| 10,409,385 B2 | 9/2019 | Poupyrev |
| 2001/0035836 A1 | 11/2001 | Miceli et al. |
| 2002/0009972 A1 | 1/2002 | Amento et al. |
| 2002/0080156 A1 | 6/2002 | Abbott et al. |
| 2002/0170897 A1 | 11/2002 | Hall |
| 2003/0005030 A1 | 1/2003 | Sutton et al. |
| 2003/0071750 A1 | 4/2003 | Benitz |
| 2003/0093000 A1 | 5/2003 | Nishio et al. |
| 2003/0100228 A1 | 5/2003 | Bungo et al. |
| 2003/0119391 A1 | 6/2003 | Swallow et al. |
| 2003/0122677 A1 | 7/2003 | Kail |
| 2004/0009729 A1 | 1/2004 | Hill et al. |
| 2004/0102693 A1 | 5/2004 | Jenkins |
| 2004/0249250 A1 | 12/2004 | McGee et al. |
| 2004/0259391 A1 | 12/2004 | Jung et al. |
| 2005/0069695 A1 | 3/2005 | Jung et al. |
| 2005/0128124 A1 | 6/2005 | Greneker et al. |
| 2005/0148876 A1 | 7/2005 | Endoh et al. |
| 2005/0231419 A1 | 10/2005 | Mitchell |
| 2005/0267366 A1 | 12/2005 | Murashita et al. |
| 2006/0035554 A1 | 2/2006 | Glaser et al. |
| 2006/0040739 A1 | 2/2006 | Wells |
| 2006/0047386 A1 | 3/2006 | Kanevsky et al. |
| 2006/0061504 A1 | 3/2006 | Leach, Jr. et al. |
| 2006/0125803 A1 | 6/2006 | Westerman et al. |
| 2006/0136997 A1* | 6/2006 | Telek .............. G01S 11/06 726/5 |
| 2006/0139162 A1 | 6/2006 | Flynn |
| 2006/0139314 A1 | 6/2006 | Bell |
| 2006/0148351 A1 | 7/2006 | Tao et al. |
| 2006/0157734 A1 | 7/2006 | Onodero et al. |
| 2006/0166620 A1 | 7/2006 | Sorensen |
| 2006/0170584 A1 | 8/2006 | Romero et al. |
| 2006/0209021 A1 | 9/2006 | Yoo et al. |
| 2006/0258205 A1 | 11/2006 | Locher et al. |
| 2006/0284757 A1 | 12/2006 | Zemany |
| 2007/0024488 A1 | 2/2007 | Zemany et al. |
| 2007/0026695 A1 | 2/2007 | Lee et al. |
| 2007/0027369 A1 | 2/2007 | Pagnacco et al. |
| 2007/0118043 A1 | 5/2007 | Oliver et al. |
| 2007/0161921 A1 | 7/2007 | Rausch |
| 2007/0164896 A1 | 7/2007 | Suzuki et al. |
| 2007/0176821 A1* | 8/2007 | Flom .............. G01S 7/412 342/25 A |
| 2007/0192647 A1 | 8/2007 | Glaser |
| 2007/0197115 A1 | 8/2007 | Eves et al. |
| 2007/0197878 A1 | 8/2007 | Shklarski |
| 2007/0210074 A1 | 9/2007 | Maurer et al. |
| 2007/0237423 A1 | 10/2007 | Tico et al. |
| 2008/0001735 A1 | 1/2008 | Tran |
| 2008/0002027 A1 | 1/2008 | Kondo et al. |
| 2008/0015422 A1 | 1/2008 | Wessel |
| 2008/0024438 A1 | 1/2008 | Collins et al. |
| 2008/0039731 A1 | 2/2008 | McCombie et al. |
| 2008/0059578 A1 | 3/2008 | Albertson et al. |
| 2008/0065291 A1 | 3/2008 | Breed |
| 2008/0074307 A1 | 3/2008 | Boric-Lubecke et al. |
| 2008/0134102 A1 | 6/2008 | Movold et al. |
| 2008/0136775 A1 | 6/2008 | Conant |
| 2008/0168396 A1 | 7/2008 | Matas et al. |
| 2008/0194204 A1* | 8/2008 | Duet .............. H04W 8/005 455/63.4 |
| 2008/0194975 A1 | 8/2008 | MacQuarrie et al. |
| 2008/0211766 A1 | 9/2008 | Westerman et al. |
| 2008/0233822 A1 | 9/2008 | Swallow et al. |
| 2008/0278450 A1 | 11/2008 | Lashina |
| 2008/0282665 A1 | 11/2008 | Speleers |
| 2008/0291158 A1 | 11/2008 | Park et al. |
| 2008/0303800 A1 | 12/2008 | Elwell |
| 2008/0316085 A1 | 12/2008 | Rofougaran et al. |
| 2008/0320419 A1 | 12/2008 | Matas et al. |
| 2009/0018408 A1 | 1/2009 | Ouchi et al. |
| 2009/0018428 A1 | 1/2009 | Dias et al. |
| 2009/0033585 A1 | 2/2009 | Lang |
| 2009/0053950 A1 | 2/2009 | Surve |
| 2009/0056300 A1 | 3/2009 | Chung et al. |
| 2009/0058820 A1 | 3/2009 | Hinckley |
| 2009/0113298 A1 | 4/2009 | Jung et al. |
| 2009/0115617 A1 | 5/2009 | Sano et al. |
| 2009/0118648 A1 | 5/2009 | Kandori et al. |
| 2009/0149036 A1 | 6/2009 | Lee et al. |
| 2009/0177068 A1 | 7/2009 | Stivoric et al. |
| 2009/0203244 A1 | 8/2009 | Toonder |
| 2009/0226043 A1 | 9/2009 | Angell et al. |
| 2009/0253585 A1 | 10/2009 | Diatchenko et al. |
| 2009/0270690 A1 | 10/2009 | Roos et al. |
| 2009/0278915 A1 | 11/2009 | Kramer et al. |
| 2009/0288762 A1 | 11/2009 | Wolfel |
| 2009/0295712 A1 | 12/2009 | Ritzau |
| 2009/0319181 A1 | 12/2009 | Khosravy et al. |
| 2010/0002912 A1* | 1/2010 | Solinsky .............. G06K 9/00248 382/117 |
| 2010/0045513 A1 | 2/2010 | Pett et al. |
| 2010/0050133 A1 | 2/2010 | Nishihara et al. |
| 2010/0053151 A1 | 3/2010 | Marti et al. |
| 2010/0060570 A1 | 3/2010 | Underkoffler et al. |
| 2010/0065320 A1 | 3/2010 | Urano |
| 2010/0069730 A1 | 3/2010 | Bergstrom et al. |
| 2010/0071205 A1 | 3/2010 | Graumann et al. |
| 2010/0094141 A1 | 4/2010 | Puswella |
| 2010/0109938 A1 | 5/2010 | Oswald et al. |
| 2010/0152600 A1 | 6/2010 | Droitcour et al. |
| 2010/0179820 A1 | 7/2010 | Harrison et al. |
| 2010/0198067 A1 | 8/2010 | Mahfouz et al. |
| 2010/0201586 A1 | 8/2010 | Michalk |
| 2010/0204550 A1 | 8/2010 | Heneghan et al. |
| 2010/0205667 A1 | 8/2010 | Anderson et al. |
| 2010/0208035 A1 | 8/2010 | Pinault et al. |
| 2010/0225562 A1 | 9/2010 | Smith |
| 2010/0234094 A1 | 9/2010 | Gagner et al. |
| 2010/0241009 A1 | 9/2010 | Petkie |
| 2010/0281438 A1 | 11/2010 | Latta et al. |
| 2010/0292549 A1 | 11/2010 | Schuler |
| 2010/0306713 A1 | 12/2010 | Geisner et al. |
| 2010/0313414 A1 | 12/2010 | Sheats |
| 2010/0324384 A1 | 12/2010 | Moon et al. |
| 2010/0325770 A1 | 12/2010 | Chung et al. |
| 2011/0003664 A1 | 1/2011 | Richard |
| 2011/0010014 A1 | 1/2011 | Oexman et al. |
| 2011/0018795 A1 | 1/2011 | Jang |
| 2011/0029038 A1 | 2/2011 | Hyde et al. |
| 2011/0073353 A1 | 3/2011 | Lee et al. |
| 2011/0083111 A1 | 4/2011 | Forutanpour et al. |
| 2011/0093820 A1 | 4/2011 | Zhang et al. |
| 2011/0118564 A1 | 5/2011 | Sankai |
| 2011/0119640 A1 | 5/2011 | Berkes et al. |
| 2011/0166940 A1 | 7/2011 | Bangera et al. |
| 2011/0181509 A1 | 7/2011 | Rautiainen et al. |
| 2011/0181510 A1 | 7/2011 | Hakala et al. |
| 2011/0193939 A1 | 8/2011 | Vassigh et al. |
| 2011/0197263 A1 | 8/2011 | Stinson, III |
| 2011/0202404 A1 | 8/2011 | van der Riet |
| 2011/0213218 A1 | 9/2011 | Weiner et al. |
| 2011/0221666 A1 | 9/2011 | Newton et al. |
| 2011/0234492 A1 | 9/2011 | Ajmera et al. |
| 2011/0239118 A1 | 9/2011 | Yamaoka et al. |
| 2011/0245688 A1 | 10/2011 | Arora et al. |
| 2011/0279303 A1 | 11/2011 | Smith |
| 2011/0286585 A1* | 11/2011 | Hodge .............. H04M 1/67 379/88.02 |
| 2011/0303341 A1 | 12/2011 | Meiss et al. |
| 2011/0307842 A1 | 12/2011 | Chiang et al. |
| 2011/0316888 A1 | 12/2011 | Sachs et al. |
| 2011/0318985 A1 | 12/2011 | McDermid |
| 2012/0001875 A1 | 1/2012 | Li et al. |
| 2012/0019168 A1 | 1/2012 | Noda et al. |
| 2012/0029369 A1 | 2/2012 | Icove et al. |
| 2012/0047468 A1 | 2/2012 | Santos et al. |

(56) References Cited

U.S. PATENT DOCUMENTS

| | | |
|---|---|---|
| 2012/0068876 A1 | 3/2012 | Bangera et al. |
| 2012/0092284 A1 | 4/2012 | Rofougaran et al. |
| 2012/0123232 A1 | 5/2012 | Najarian et al. |
| 2012/0127082 A1 | 5/2012 | Kushler et al. |
| 2012/0144934 A1 | 6/2012 | Russell et al. |
| 2012/0150493 A1 | 6/2012 | Casey et al. |
| 2012/0154313 A1 | 6/2012 | Au et al. |
| 2012/0156926 A1 | 6/2012 | Kato et al. |
| 2012/0174299 A1 | 7/2012 | Balzano |
| 2012/0174736 A1 | 7/2012 | Wang et al. |
| 2012/0182222 A1 | 7/2012 | Moloney |
| 2012/0193801 A1 | 8/2012 | Gross et al. |
| 2012/0220835 A1 | 8/2012 | Chung |
| 2012/0248093 A1 | 10/2012 | Ulrich et al. |
| 2012/0254810 A1 | 10/2012 | Heck et al. |
| 2012/0268416 A1 | 10/2012 | Pirogov et al. |
| 2012/0270564 A1 | 10/2012 | Gum et al. |
| 2012/0280900 A1* | 11/2012 | Wang .................... G06F 3/0488 345/156 |
| 2012/0298748 A1 | 11/2012 | Factor et al. |
| 2012/0310665 A1 | 12/2012 | Xu et al. |
| 2013/0016070 A1 | 1/2013 | Starner et al. |
| 2013/0027218 A1 | 1/2013 | Schwarz et al. |
| 2013/0035563 A1 | 2/2013 | Angelides |
| 2013/0046544 A1 | 2/2013 | Kay et al. |
| 2013/0053653 A1 | 2/2013 | Cuddihy et al. |
| 2013/0078624 A1 | 3/2013 | Holmes et al. |
| 2013/0082922 A1 | 4/2013 | Miller |
| 2013/0083173 A1 | 4/2013 | Geisner et al. |
| 2013/0086533 A1 | 4/2013 | Stienstra |
| 2013/0096439 A1 | 4/2013 | Lee et al. |
| 2013/0102217 A1 | 4/2013 | Jeon |
| 2013/0104084 A1 | 4/2013 | Mlyniec et al. |
| 2013/0113647 A1 | 5/2013 | Sentelle et al. |
| 2013/0113830 A1 | 5/2013 | Suzuki |
| 2013/0117377 A1 | 5/2013 | Miller |
| 2013/0132931 A1 | 5/2013 | Bruns et al. |
| 2013/0147833 A1 | 6/2013 | Aubauer et al. |
| 2013/0150735 A1 | 6/2013 | Cheng |
| 2013/0161078 A1 | 6/2013 | Li |
| 2013/0169471 A1 | 7/2013 | Lynch |
| 2013/0176161 A1* | 7/2013 | Derham .................... G01S 7/36 342/27 |
| 2013/0194173 A1 | 8/2013 | Zhu et al. |
| 2013/0195330 A1 | 8/2013 | Kim et al. |
| 2013/0196716 A1 | 8/2013 | Khurram |
| 2013/0207962 A1 | 8/2013 | Oberdorfer et al. |
| 2013/0229508 A1 | 9/2013 | Li et al. |
| 2013/0241765 A1 | 9/2013 | Kozma et al. |
| 2013/0245986 A1 | 9/2013 | Grokop et al. |
| 2013/0253029 A1 | 9/2013 | Jain et al. |
| 2013/0260630 A1 | 10/2013 | Ito et al. |
| 2013/0278499 A1 | 10/2013 | Anderson |
| 2013/0278501 A1 | 10/2013 | Bulzacki |
| 2013/0281024 A1 | 10/2013 | Rofougaran et al. |
| 2013/0283203 A1 | 10/2013 | Batraski et al. |
| 2013/0322729 A1 | 12/2013 | Mestha et al. |
| 2013/0332438 A1 | 12/2013 | Li et al. |
| 2013/0345569 A1 | 12/2013 | Mestha et al. |
| 2014/0005809 A1 | 1/2014 | Frei et al. |
| 2014/0022108 A1 | 1/2014 | Alberth et al. |
| 2014/0028539 A1 | 1/2014 | Newham et al. |
| 2014/0049487 A1 | 2/2014 | Konertz et al. |
| 2014/0050354 A1 | 2/2014 | Heim et al. |
| 2014/0051941 A1 | 2/2014 | Messerschmidt |
| 2014/0070957 A1 | 3/2014 | Longinotti-Buitoni et al. |
| 2014/0072190 A1 | 3/2014 | Wu et al. |
| 2014/0073486 A1 | 3/2014 | Ahmed et al. |
| 2014/0073969 A1 | 3/2014 | Zou et al. |
| 2014/0081100 A1 | 3/2014 | Muhsin et al. |
| 2014/0095480 A1 | 4/2014 | Marantz et al. |
| 2014/0097979 A1 | 4/2014 | Nohara et al. |
| 2014/0121540 A1 | 5/2014 | Raskin |
| 2014/0135631 A1 | 5/2014 | Brumback et al. |
| 2014/0139422 A1 | 5/2014 | Mistry et al. |
| 2014/0139616 A1 | 5/2014 | Pinter et al. |
| 2014/0143678 A1 | 5/2014 | Mistry et al. |
| 2014/0149859 A1 | 5/2014 | Van Dyken et al. |
| 2014/0184496 A1 | 7/2014 | Gribetz et al. |
| 2014/0184499 A1 | 7/2014 | Kim |
| 2014/0191939 A1 | 7/2014 | Penn et al. |
| 2014/0200416 A1 | 7/2014 | Kashef et al. |
| 2014/0201690 A1 | 7/2014 | Holz |
| 2014/0208275 A1 | 7/2014 | Mongia et al. |
| 2014/0215389 A1 | 7/2014 | Walsh et al. |
| 2014/0239065 A1 | 8/2014 | Zhou et al. |
| 2014/0244277 A1 | 8/2014 | Krishna Rao et al. |
| 2014/0246415 A1 | 9/2014 | Wittkowski |
| 2014/0247212 A1 | 9/2014 | Kim et al. |
| 2014/0250515 A1 | 9/2014 | Jakobsson |
| 2014/0253431 A1 | 9/2014 | Gossweiler et al. |
| 2014/0253709 A1 | 9/2014 | Bresch et al. |
| 2014/0262478 A1 | 9/2014 | Harris et al. |
| 2014/0275854 A1 | 9/2014 | Venkatraman et al. |
| 2014/0280295 A1 | 9/2014 | Kurochikin et al. |
| 2014/0281975 A1 | 9/2014 | Anderson |
| 2014/0282877 A1* | 9/2014 | Mahaffey ............ H04L 63/0853 726/3 |
| 2014/0297006 A1 | 10/2014 | Sadhu |
| 2014/0298266 A1 | 10/2014 | Lapp |
| 2014/0300506 A1* | 10/2014 | Teter .................... G01S 7/415 342/104 |
| 2014/0306936 A1* | 10/2014 | Dahl .................... G06F 3/0436 345/177 |
| 2014/0309855 A1 | 10/2014 | Tran |
| 2014/0316261 A1 | 10/2014 | Lux et al. |
| 2014/0318699 A1 | 10/2014 | Longinotti-Buitoni et al. |
| 2014/0324888 A1 | 10/2014 | Xie et al. |
| 2014/0329567 A1 | 11/2014 | Chan et al. |
| 2014/0333467 A1 | 11/2014 | Inomata |
| 2014/0343392 A1 | 11/2014 | Yang |
| 2014/0347295 A1 | 11/2014 | Kim et al. |
| 2014/0357369 A1 | 12/2014 | Callens et al. |
| 2014/0368378 A1 | 12/2014 | Crain et al. |
| 2014/0368441 A1 | 12/2014 | Touloumtzis |
| 2014/0376788 A1 | 12/2014 | Xu et al. |
| 2015/0002391 A1 | 1/2015 | Chen |
| 2015/0009096 A1 | 1/2015 | Lee et al. |
| 2015/0026815 A1 | 1/2015 | Barrett |
| 2015/0029050 A1 | 1/2015 | Driscoll et al. |
| 2015/0030256 A1 | 1/2015 | Brady et al. |
| 2015/0040040 A1 | 2/2015 | Balan et al. |
| 2015/0046183 A1 | 2/2015 | Cireddu |
| 2015/0062033 A1 | 3/2015 | Ishihara |
| 2015/0068069 A1 | 3/2015 | Tran et al. |
| 2015/0077282 A1 | 3/2015 | Mohamadi |
| 2015/0085060 A1 | 3/2015 | Fish et al. |
| 2015/0091820 A1 | 4/2015 | Rosenberg et al. |
| 2015/0091858 A1 | 4/2015 | Rosenberg et al. |
| 2015/0091859 A1 | 4/2015 | Rosenberg et al. |
| 2015/0091903 A1 | 4/2015 | Costello et al. |
| 2015/0095987 A1 | 4/2015 | Potash et al. |
| 2015/0099941 A1 | 4/2015 | Tran |
| 2015/0100328 A1 | 4/2015 | Kress et al. |
| 2015/0106770 A1 | 4/2015 | Shah et al. |
| 2015/0109164 A1 | 4/2015 | Takaki |
| 2015/0112606 A1 | 4/2015 | He et al. |
| 2015/0133017 A1 | 5/2015 | Liao et al. |
| 2015/0143601 A1 | 5/2015 | Longinotti-Buitoni et al. |
| 2015/0145805 A1 | 5/2015 | Liu |
| 2015/0162729 A1 | 6/2015 | Reversat et al. |
| 2015/0177866 A1 | 6/2015 | Hwang et al. |
| 2015/0185314 A1 | 7/2015 | Corcos et al. |
| 2015/0199045 A1 | 7/2015 | Robucci et al. |
| 2015/0205358 A1 | 7/2015 | Lyren |
| 2015/0223733 A1* | 8/2015 | Al-Alusi ................ A61B 5/0507 600/479 |
| 2015/0226004 A1 | 8/2015 | Thompson |
| 2015/0229885 A1 | 8/2015 | Offenhaeuser |
| 2015/0256763 A1 | 9/2015 | Niemi |
| 2015/0261320 A1 | 9/2015 | Leto |
| 2015/0268027 A1 | 9/2015 | Gerdes |
| 2015/0268799 A1 | 9/2015 | Starner et al. |
| 2015/0277569 A1 | 10/2015 | Sprenger et al. |

(56) References Cited

U.S. PATENT DOCUMENTS

| | | | |
|---|---|---|---|
| 2015/0280102 A1 | 10/2015 | Tajitsu et al. | |
| 2015/0285906 A1 | 10/2015 | Hooper et al. | |
| 2015/0287187 A1 | 10/2015 | Redtel | |
| 2015/0301167 A1 | 10/2015 | Sentelle et al. | |
| 2015/0312041 A1 | 10/2015 | Choi | |
| 2015/0314780 A1 | 11/2015 | Stenneth et al. | |
| 2015/0317518 A1 | 11/2015 | Fujimaki et al. | |
| 2015/0323993 A1 | 11/2015 | Levesque et al. | |
| 2015/0332075 A1 | 11/2015 | Burch | |
| 2015/0341550 A1 | 11/2015 | Lay | |
| 2015/0346820 A1 | 12/2015 | Poupyrev et al. | |
| 2015/0350902 A1* | 12/2015 | Baxley | H04W 4/90 726/7 |
| 2015/0351703 A1 | 12/2015 | Phillips et al. | |
| 2015/0375339 A1 | 12/2015 | Sterling et al. | |
| 2016/0018948 A1 | 1/2016 | Parvarandeh et al. | |
| 2016/0026253 A1 | 1/2016 | Bradski et al. | |
| 2016/0038083 A1 | 2/2016 | Ding et al. | |
| 2016/0041617 A1 | 2/2016 | Poupyrev | |
| 2016/0041618 A1 | 2/2016 | Poupyrev | |
| 2016/0042169 A1* | 2/2016 | Polehn | G06F 21/35 726/20 |
| 2016/0048235 A1 | 2/2016 | Poupyrev | |
| 2016/0048236 A1 | 2/2016 | Poupyrev | |
| 2016/0048672 A1* | 2/2016 | Lux | G06F 21/32 340/5.82 |
| 2016/0054792 A1 | 2/2016 | Poupyrev | |
| 2016/0054803 A1 | 2/2016 | Poupyrev | |
| 2016/0054804 A1 | 2/2016 | Gollakata et al. | |
| 2016/0055201 A1 | 2/2016 | Poupyrev et al. | |
| 2016/0090839 A1 | 3/2016 | Stolarcyzk | |
| 2016/0098089 A1 | 4/2016 | Poupyrev | |
| 2016/0100166 A1 | 4/2016 | Dragne et al. | |
| 2016/0103500 A1 | 4/2016 | Hussey et al. | |
| 2016/0106328 A1 | 4/2016 | Mestha et al. | |
| 2016/0131741 A1* | 5/2016 | Park | G01S 13/42 342/194 |
| 2016/0140872 A1 | 5/2016 | Palmer et al. | |
| 2016/0145776 A1 | 5/2016 | Roh | |
| 2016/0146931 A1 | 5/2016 | Rao et al. | |
| 2016/0170491 A1 | 6/2016 | Jung | |
| 2016/0171293 A1 | 6/2016 | Li et al. | |
| 2016/0186366 A1 | 6/2016 | McMaster | |
| 2016/0206244 A1 | 7/2016 | Rogers | |
| 2016/0213331 A1 | 7/2016 | Gil et al. | |
| 2016/0216825 A1 | 7/2016 | Forutanpour | |
| 2016/0220152 A1 | 8/2016 | Meriheina et al. | |
| 2016/0249698 A1 | 9/2016 | Berzowska et al. | |
| 2016/0252607 A1 | 9/2016 | Saboo et al. | |
| 2016/0252965 A1 | 9/2016 | Mandella et al. | |
| 2016/0253044 A1 | 9/2016 | Katz | |
| 2016/0259037 A1 | 9/2016 | Molchanov et al. | |
| 2016/0262685 A1 | 9/2016 | Wagner et al. | |
| 2016/0282988 A1 | 9/2016 | Poupyrev | |
| 2016/0283101 A1 | 9/2016 | Schwesig et al. | |
| 2016/0284436 A1 | 9/2016 | Fukuhara et al. | |
| 2016/0287172 A1 | 10/2016 | Morris et al. | |
| 2016/0299526 A1 | 10/2016 | Inagaki et al. | |
| 2016/0320852 A1 | 11/2016 | Poupyrev | |
| 2016/0320853 A1 | 11/2016 | Lien et al. | |
| 2016/0320854 A1 | 11/2016 | Lien et al. | |
| 2016/0321428 A1 | 11/2016 | Rogers | |
| 2016/0338599 A1 | 11/2016 | DeBusschere et al. | |
| 2016/0345638 A1 | 12/2016 | Robinson et al. | |
| 2016/0349790 A1 | 12/2016 | Connor | |
| 2016/0349845 A1 | 12/2016 | Poupyrev et al. | |
| 2016/0377712 A1 | 12/2016 | Wu et al. | |
| 2017/0029985 A1 | 2/2017 | Tajitsu et al. | |
| 2017/0052618 A1 | 2/2017 | Lee et al. | |
| 2017/0060254 A1 | 3/2017 | Molchanov et al. | |
| 2017/0060298 A1 | 3/2017 | Hwang et al. | |
| 2017/0075481 A1 | 3/2017 | Chou et al. | |
| 2017/0075496 A1 | 3/2017 | Rosenberg et al. | |
| 2017/0097413 A1 | 4/2017 | Gillian et al. | |
| 2017/0097684 A1 | 4/2017 | Lien | |
| 2017/0115777 A1 | 4/2017 | Poupyrev | |
| 2017/0124407 A1 | 5/2017 | Micks et al. | |
| 2017/0125940 A1 | 5/2017 | Karagozler et al. | |
| 2017/0192523 A1 | 7/2017 | Poupyrev | |
| 2017/0192629 A1 | 7/2017 | Takada et al. | |
| 2017/0196513 A1 | 7/2017 | Longinotti-Buitoni et al. | |
| 2017/0231089 A1 | 8/2017 | Van Keymeulen | |
| 2017/0232538 A1 | 8/2017 | Robinson et al. | |
| 2017/0233903 A1 | 8/2017 | Jeon | |
| 2017/0249033 A1 | 8/2017 | Podhajny et al. | |
| 2017/0322633 A1 | 11/2017 | Shen et al. | |
| 2017/0325337 A1 | 11/2017 | Karagozler et al. | |
| 2017/0325518 A1 | 11/2017 | Poupyrev et al. | |
| 2017/0329412 A1 | 11/2017 | Schwesig et al. | |
| 2017/0329425 A1 | 11/2017 | Karagozler et al. | |
| 2018/0000354 A1 | 1/2018 | DeBusschere et al. | |
| 2018/0000355 A1 | 1/2018 | DeBusschere et al. | |
| 2018/0004301 A1 | 1/2018 | Poupyrev | |
| 2018/0005766 A1 | 1/2018 | Fairbanks et al. | |
| 2018/0046258 A1 | 2/2018 | Poupyrev | |
| 2018/0095541 A1 | 4/2018 | Gribetz et al. | |
| 2018/0106897 A1* | 4/2018 | Shouldice | A61B 5/7264 |
| 2018/0113032 A1 | 4/2018 | Dickey et al. | |
| 2018/0157330 A1 | 6/2018 | Gu et al. | |
| 2018/0160943 A1* | 6/2018 | Fyfe | A63B 71/06 |
| 2018/0177464 A1 | 6/2018 | DeBusschere et al. | |
| 2018/0196527 A1 | 7/2018 | Poupyrev et al. | |
| 2018/0256106 A1 | 9/2018 | Rogers et al. | |
| 2018/0296163 A1 | 10/2018 | DeBusschere et al. | |
| 2018/0321841 A1 | 11/2018 | Lapp | |
| 2019/0033981 A1 | 1/2019 | Poupyrev | |
| 2019/0138109 A1 | 5/2019 | Poupyrev et al. | |
| 2019/0155396 A1 | 5/2019 | Lien et al. | |
| 2019/0208837 A1 | 7/2019 | Poupyrev et al. | |
| 2019/0232156 A1 | 8/2019 | Amihood et al. | |
| 2019/0243464 A1 | 8/2019 | Lien et al. | |
| 2019/0257939 A1 | 8/2019 | Schwesig et al. | |

FOREIGN PATENT DOCUMENTS

| | | |
|---|---|---|
| CN | 102414641 | 4/2012 |
| CN | 102782612 | 11/2012 |
| CN | 102893327 | 1/2013 |
| CN | 202887794 | 4/2013 |
| CN | 103076911 | 5/2013 |
| CN | 103502911 | 1/2014 |
| CN | 102660988 | 3/2014 |
| CN | 104035552 | 9/2014 |
| CN | 103355860 | 1/2016 |
| DE | 102011075725 | 11/2012 |
| DE | 102013201359 | 7/2014 |
| EP | 0161895 | 11/1985 |
| EP | 1785744 | 5/2007 |
| EP | 1815788 | 8/2007 |
| EP | 2417908 | 2/2012 |
| EP | 2637081 | 9/2013 |
| EP | 2770408 | 8/2014 |
| EP | 2953007 | 12/2015 |
| EP | 3201726 | 8/2017 |
| FR | 3017722 | 8/2015 |
| GB | 2070469 | 9/1981 |
| GB | 2443208 | 4/2008 |
| JP | 113860 | 4/1999 |
| JP | 11168268 | 6/1999 |
| JP | 2003280049 | 10/2003 |
| JP | 2006234716 | 9/2006 |
| JP | 2007011873 | 1/2007 |
| JP | 2007132768 | 5/2007 |
| JP | 2008277714 | 11/2008 |
| JP | 2009037434 | 2/2009 |
| JP | 2011102457 | 5/2011 |
| JP | 2012185833 | 9/2012 |
| JP | 2012198916 | 10/2012 |
| JP | 2013196047 | 9/2013 |
| JP | 2014532332 | 12/2014 |
| KR | 1020080102516 | 11/2008 |
| KR | 100987650 | 10/2010 |
| KR | 1020140055985 | 5/2014 |
| KR | 101914850 | 10/2018 |

(56) References Cited

FOREIGN PATENT DOCUMENTS

| | | |
|---|---|---|
| TW | 201425974 | 7/2014 |
| WO | 9001895 | 3/1990 |
| WO | WO-0130123 | 4/2001 |
| WO | WO-2001027855 | 4/2001 |
| WO | WO-0175778 | 10/2001 |
| WO | WO-2002082999 | 10/2002 |
| WO | 2004004557 | 1/2004 |
| WO | 2004053601 | 6/2004 |
| WO | WO-2005033387 | 4/2005 |
| WO | 2007125298 | 11/2007 |
| WO | WO-2008061385 | 5/2008 |
| WO | WO-2009032073 | 3/2009 |
| WO | 2009083467 | 7/2009 |
| WO | WO-2010032173 | 3/2010 |
| WO | 2010101697 | 9/2010 |
| WO | WO-2012026013 | 3/2012 |
| WO | 2012064847 | 5/2012 |
| WO | WO-2012152476 | 11/2012 |
| WO | WO-2013082806 | 6/2013 |
| WO | WO-2013084108 | 6/2013 |
| WO | 2013192166 | 12/2013 |
| WO | WO-2013186696 | 12/2013 |
| WO | WO-2013191657 | 12/2013 |
| WO | WO-2014019085 | 2/2014 |
| WO | 2014085369 | 6/2014 |
| WO | WO-2014116968 | 7/2014 |
| WO | 2014124520 | 8/2014 |
| WO | WO-2014136027 | 9/2014 |
| WO | WO-2014138280 | 9/2014 |
| WO | WO-2014160893 | 10/2014 |
| WO | WO-2014165476 | 10/2014 |
| WO | WO-2014204323 | 12/2014 |
| WO | WO-2015017931 | 2/2015 |
| WO | WO-2015022671 | 2/2015 |
| WO | 2015149049 | 10/2015 |
| WO | 2016053624 | 4/2016 |
| WO | 2016118534 | 7/2016 |
| WO | 2016176471 | 11/2016 |
| WO | 2016178797 | 11/2016 |
| WO | 2017019299 | 2/2017 |
| WO | 2017062566 | 4/2017 |
| WO | 2017200571 | 11/2017 |
| WO | 20170200949 | 11/2017 |
| WO | 2018106306 | 6/2018 |

OTHER PUBLICATIONS

Jonathan L. Geisheimer, Eugene Greneker "A continuous-wave (CW) radar for gait analysis", IEEE, 2011, pp. 834-838 (Year: 2001).*

Dmitry S. Garmatyuk and Ram M. Narayanan "Ultra-wideband contnuous-wave random noise Arc-SAR", IEEE, 2002, pp. 2543-2552 (Year: 2002).*

"Combined Search and Examination Report", GB Application No. 1620892.8, dated Apr. 6, 2017, 5 pages.

"Corrected Notice of Allowance", U.S. Appl. No. 14/930,220, dated Mar. 20, 2017, 2 pages.

"Corrected Notice of Allowance", U.S. Appl. No. 14/930,220, dated May 11, 2017, 2 pages.

"Final Office Action", U.S. Appl. No. 14/518,863, dated May 5, 2017, 18 pages.

"First Action Interview Office Action", U.S. Appl. No. 14/959,901, dated Apr. 14, 2017, 3 pages.

"International Preliminary Report on Patentability", Application No. PCT/US2015/050903, dated Apr. 13, 2017, 12 pages.

"International Search Report and Written Opinion", Application No. PCT/US2016/060399, dated Jan. 30, 2017, 11 pages.

"Non-Final Office Action", U.S. Appl. No. 14/504,038, dated Mar. 22, 2017, 33 pages.

"Non-Final Office Action", U.S. Appl. No. 15/403,066, dated May 4, 2017, 31 pages.

"Notice of Allowance", U.S. Appl. No. 14/494,863, dated May 30, 2017, 7 pages.

"Pre-Interview Communication", U.S. Appl. No. 15/343,067, dated Apr. 19, 2017, 3 pages.

"Textile Wire Brochure", Retrieved at: http://www.textile-wire.ch/en/home.html, Aug. 7, 2004, 17 pages.

Stoppa,"Wearable Electronics and Smart Textiles: A Critical Review", In Proceedings of Sensors, vol. 14, Issue 7, Jul. 7, 2014, pp. 11957-11992.

"Advisory Action", U.S. Appl. No. 14/504,139, dated Aug. 28, 2017, 3 pages.

"Final Office Action", U.S. Appl. No. 14/959,901, dated Aug. 25, 2017, 19 pages.

"Final Office Action", U.S. Appl. No. 15/403,066, dated Oct. 5, 2017, 31 pages.

"Non-Final Office Action", U.S. Appl. No. 15/093,533, dated Aug. 24, 2017, 18 pages.

"Non-Final Office Action", U.S. Appl. No. 15/142,619, dated Aug. 25, 2017, 16 pages.

"Non-Final Office Action", U.S. Appl. No. 14/959,799, dated Sep. 8, 2017, 16 pages.

"Non-Final Office Action", U.S. Appl. No. 15/398,147, dated Sep. 8, 2017, 7 pages.

"Non-Final Office Action", U.S. Appl. No. 14/518,863, dated Sep. 29, 2017, 20 pages.

"Non-Final Office Action", U.S. Appl. No. 15/142,689, dated Oct. 4, 2017, 18 pages.

"Pre-Interview Office Action", U.S. Appl. No. 14/862,409, dated Sep. 15, 2017, 16 pages.

"Written Opinion", PCT Application No. PCT/US2016/055671, dated Apr. 13, 2017, 8 pages.

"Written Opinion", PCT Application No. PCT/US2017/032733, dated Jul. 26, 2017, 5 pages.

"Final Office Action", U.S. Appl. No. 14/959,799, dated Jan. 4, 2018, 17 pages.

"Final Office Action", U.S. Appl. No. 14/959,730, dated Nov. 22, 2017, 16 pages.

"International Search Report and Written Opinion", PCT/US2017/047691, dated Nov. 16, 2017, 13.

"International Search Report and Written Opinion", PCT Application No. PCT/US2017/051663, dated Nov. 29, 2017, 16 pages.

"Non-Final Office Action", U.S. Appl. No. 14/504,121, dated Jan. 2, 2018, 19 pages.

"Non-Final Office Action", U.S. Appl. No. 14/959,901, dated Jan. 8, 2018, 21 pages.

"Non-Final Office Action", U.S. Appl. No. 14/504,139, dated Oct. 18, 2017, 12 pages.

"Non-Final Office Action", U.S. Appl. No. 15/595,649, dated Oct. 31, 2017, 16 pages.

"Non-Final Office Action", U.S. Appl. No. 14/862,409, dated Dec. 14, 2017, 17 pages.

"Notice of Allowance", U.S. Appl. No. 15/403,066, dated Jan. 8, 2018, 18 pages.

"Notice of Allowance", U.S. Appl. No. 14/874,955, dated Oct. 20, 2017, 7 pages.

"Notice of Allowance", U.S. Appl. No. 15/398,147, dated Nov. 15, 2017, 8 pages.

"Notice of Publication", U.S. Appl. No. 15/703,511, dated Jan. 4, 2018, 1 page.

"Restriction Requirement", U.S. Appl. No. 15/362,359, dated Jan. 8, 2018, 5 pages.

Bondade, et al., "A linear-assisted DC-DC hybrid power converter for envelope tracking RF power amplifiers", 2014 IEEE Energy Conversion Congress and Exposition (ECCE), IEEE, Sep. 14, 2014, pp. 5769-5773, XP032680873, DOI: 10.1109/ECCE.2014.6954193, Sep. 14, 2014, 5 pages.

Fan, et al., "Wireless Hand Gesture Recognition Based on Continuous-Wave Doppler Radar Sensors", IEEE Transactions on Microwave Theory and Techniques, Plenum, USA, vol. 64, No. 11, Nov. 1, 2016 (Nov. 1, 2016), pp. 4012-4012, XP011633246, ISSN: 0018-9480, DOI: 10.1109/TMTT.2016.2610427, Nov. 1, 2016, 9 pages.

Lien, et al., "Soli: Ubiquitous Gesture Sensing with Millimeter Wave Radar", ACM Transactions on Graphics (TOG), ACM, Us,

(56) References Cited

OTHER PUBLICATIONS vol. 35, No. 4, Jul. 11, 2016 (Jul. 11, 2016), pp. 1-19, XP058275791, ISSN: 0730-0301, DOI: 10.1145/2897824.2925953, Jul. 11, 2016, 19 pages.
Martinez-Garcia, et al., "Four-quadrant linear-assisted DC/DC voltage regulator", Analog Integrated Circuits and Signal Processing, Springer New York LLC, US, vol. 88, No. 1, Apr. 23, 2016 (Apr. 23, 2016), pp. 151-160, XP035898949, ISSN: 0925-1030, DOI: 10.1007/S10470-016-0747-8, Apr. 23, 2016, 10 pages.
Skolnik, "CW and Frequency-Modulated Radar", In: "Introduction to Radar Systems", Jan. 1, 1981 (Jan. 1, 1981), McGraw Hill, XP055047545, ISBN: 978-0-07-057909-5 pp. 68-100, p. 95-p. 97, Jan. 1, 1981, 18 pages.
Zheng, et al., "Doppler Bio-Signal Detection Based Time-Domain Hand Gesture Recognition", 2013 IEEE MTT-S International Microwave Workshop Series on RF and Wireless Technologies for Biomedical and Healthcare Applications (IMWS-BIO), IEEE, Dec. 9, 2013 (Dec. 9, 2013), p. 3, XP032574214, DOI: 10.1109/IMWS-BIO.2013.6756200, Dec. 9, 2013, 3 Pages.
"Cardiio", Retrieved From: <http://www.cardiio.com/> Apr. 15, 2015 App Information Retrieved From: <https://itunes.apple.com/us/app/cardiio-touchless-camera-pulse/id542891434?Is=1&mt=8> Apr. 15, 2015, Feb. 24, 2015, 6 pages.
"Extended European Search Report", EP Application No. 15170577.9, dated Nov. 5, 2015, 12 pages.
"Final Office Action", U.S. Appl. No. 14/312,486, dated Jun. 3, 2016, 32 pages.
"Final Office Action", U.S. Appl. No. 14/504,038, dated Sep. 27, 2016, 23 pages.
"Final Office Action", U.S. Appl. No. 14/504,061, dated Mar. 9, 2016, 10 pages.
"Frogpad Introduces Wearable Fabric Keyboard with Bluetooth Technology", Retrieved From: <http://www.geekzone.co.nz/content.asp?contentid=3898> Mar. 16, 2015, Jan. 7, 2005, 2 pages.
"International Search Report and Written Opinion", Application No. PCT/US2015/044774, dated Nov. 3, 2015, 12 pages.
"International Search Report and Written Opinion", Application No. PCT/US2016/024267, dated Jun. 20, 2016, 13 pages.
"International Search Report and Written Opinion", Application No. PCT/US2016/024273, dated Jun. 20, 2016, 13 pages.
"International Search Report and Written Opinion", Application No. PCT/US2016/032307, dated Aug. 25, 2016, 13 pages.
"International Search Report and Written Opinion", Application No. PCT/US2016/029820, dated Jul. 15, 2016, 14 pages.
"International Search Report and Written Opinion", Application No. PCT/US2016/030177, dated Aug. 2, 2016, 15 pages.
"International Search Report and Written Opinion", Application No. PCT/US2015/043963, dated Nov. 24, 2015, 16 pages.
"International Search Report and Written Opinion", Application No. PCT/US2015/050903, dated Feb. 19, 2016, 18 pages.
"International Search Report and Written Opinion", Application No. PCT/US2016/030115, dated Aug. 8, 2016, 18 pages.
"International Search Report and Written Opinion", Application No. PCT/US2015/043949, dated Dec. 1, 2015, 18 pages.
"Non-Final Office Action", U.S. Appl. No. 14/312,486, dated Oct. 23, 2015, 25 pages.
"Non-Final Office Action", U.S. Appl. No. 14/504,038, dated Feb. 26, 2016, 22 pages.
"Non-Final Office Action", U.S. Appl. No. 14/504,061, dated Nov. 4, 2015, 8 pages.
"Non-Final Office Action", U.S. Appl. No. 14/582,896, dated Jun. 29, 2016, 9 pages.
"Non-Final Office Action", U.S. Appl. No. 14/666,155, dated Aug. 24, 2016, 9 pages.
"Non-Final Office Action", U.S. Appl. No. 14/681,625, dated Aug. 12, 2016, 9 pages.
"Non-Final Office Action", U.S. Appl. No. 14/930,220, dated Sep. 14, 2016, 15 pages.
"Notice of Allowance", U.S. Appl. No. 14/504,061, dated Sep. 12, 2016, 7 pages.
"Philips Vital Signs Camera", Retrieved From: <http://www.vitalsignscamera.com/> Apr. 15, 2015, Jul. 17, 2013, 2 pages.
"Restriction Requirement", U.S. Appl. No. 14/666,155, dated Jul. 22, 2016, 5 pages.
"The Instant Blood Pressure app estimates blood pressure with your smartphone and our algorithm", Retrieved at: http://www.instantbloodpressure.com/—on Jun. 23, 2016, 6 pages.
Arbabian,"A 94GHz mm-Wave to Baseband Pulsed-Radar for Imaging and Gesture Recognition", 2012 IEEE, 2012 Symposium on VLSI Circuits Digest of Technical Papers, 2012, 2 pages.
Balakrishnan,"Detecting Pulse from Head Motions in Video", In Proceedings: CVPR '13 Proceedings of the 2013 IEEE Conference on Computer Vision and Pattern Recognition Available at: <http://people.csail.mit.edu/mrub/vidmag/papers/Balakrishnan_Detecting_Pulse_from_2013_CVPR_paper.pdf>, Jun. 23, 2013, 8 pages.
Couderc,"Detection of Atrial Fibrillation using Contactless Facial Video Monitoring", In Proceedings: Heart Rhythm Society, vol. 12, Issue 1 Available at: <http://www.heartrhythmjournal.com/article/S1547-5271(14)00924-2/pdf>, Jan. 2015, 7 pages.
Espina,"Wireless Body Sensor Network for Continuous Cuff-less Blood Pressure Monitoring", International Summer School on Medical Devices and Biosensors, 2006, Sep. 2006, 5 pages.
Godana,"Human Movement Characterization in Indoor Environment using GNU Radio Based Radar", Retrieved at: http://repository.tudelft.nl/islandora/object/uuid:414e1868-dd00-4113-9989-4c213f1f7094?collection=education, Nov. 30, 2009, 100 pages.
He,"A Continuous, Wearable, and Wireless Heart Monitor Using Head Ballistocardiogram (BCG) and Head Electrocardiogram (ECG) with a Nanowatt ECG Heartbeat Detection Circuit", In Proceedings: Thesis, Department of Electrical Engineering and Computer Science, Massachusetts Institute of Technology Available at: <http://dspace.mit.edu/handle/1721.1/79221>, Feb. 2013, 137 pages.
Holleis,"Evaluating Capacitive Touch Input on Clothes", Proceedings of the 10th International Conference on Human Computer Interaction, Jan. 1, 2008, 10 pages.
Nakajima,"Development of Real-Time Image Sequence Analysis for Evaluating Posture Change and Respiratory Rate of a Subject in Bed", In Proceedings: Physiological Measurement, vol. 22, No. 3 Retrieved From: <http://iopscience.iop.org/0967-3334/22/3/401/pdf/0967-3334_22_3_401.pdf> Feb. 27, 2015, Aug. 2001, 8 pages.
Patel,"Applications of Electrically Conductive Yarns in Technical Textiles", International Conference on Power System Technology (POWECON), Oct. 30, 2012, 6 pages.
Poh,"A Medical Mirror for Non-contact Health Monitoring", In Proceedings: ACM SIGGRAPH Emerging Technologies Available at: <http://affect.media.mit.edu/pdfs/11.Poh-etal-SIGGRAPH.pdf>, 2011, 1 page.
Poh,"Non-contact, Automated Cardiac Pulse Measurements Using Video Imaging and Blind Source Separation.", In Proceedings: Optics Express, vol. 18, No. 10 Available at: <http://www.opticsinfobase.org/view_article.cfm?gotourl=http%3A%2F%2Fwww%2Eopticsinfobase%2Eorg%2FDirectPDFAccess%2F77B04D55%2DBC95%2D6937%2D5BAC49A426378C02%5F199381%2Foe%2D18%2D10%2D10762%2Ep, May 7, 2010, 13 pages.
Pu,"Whole-Home Gesture Recognition Using Wireless Signals", MobiCom '13 Proceedings of the 19th annual international conference on Mobile computing & networking, Aug. 27, 2013, 12 pages.
Wang,"Exploiting Spatial Redundancy of Image Sensor for Motion Robust rPPG", In Proceedings: IEEE Transactions on Biomedical Engineering, vol. 62, Issue 2, Jan. 19, 2015, 11 pages.
Wang,"Micro-Doppler Signatures for Intelligent Human Gait Recognition Using a UWB Impulse Radar", 2011 IEEE International Symposium on Antennas and Propagation (APSURSI), Jul. 3, 2011, pp. 2103-2106.
Wijesiriwardana,"Capacitive Fibre-Meshed Transducer for Touch & Proximity Sensing Applications", IEEE Sensors Journal, IEEE Service Center, Oct. 1, 2005, 5 pages.
Zhadobov,"Millimeter-wave Interactions with the Human Body: State of Knowledge and Recent Advances", International Journal of Microwave and Wireless Technologies, Mar. 1, 2011, 11 pages.
Zhang,"Study of the Structural Design and Capacitance Characteristics of Fabric Sensor", Advanced Materials Research (vols. 194-196), Feb. 21, 2011, 8 pages.

(56) References Cited

OTHER PUBLICATIONS

"Corrected Notice of Allowance", U.S. Appl. No. 15/362,359, dated Sep. 17, 2018, 10 pages.
"Final Office Action", U.S. Appl. No. 14/504,121, dated Jul. 9, 2018, 23 pages.
"Final Office Action", U.S. Appl. No. 15/166,198, dated Sep. 27, 2018, 33 pages.
"Foreign Office Action", Japanese Application No. 2018-501256, dated Jul. 24, 2018, 11 pages.
"Non-Final Office Action", U.S. Appl. No. 15/287,253, dated Sep. 7, 2018, 20 pages.
"Non-Final Office Action", U.S. Appl. No. 14/504,139, dated Oct. 5, 2018, 16 pages.
"Non-Final Office Action", U.S. Appl. No. 15/286,512, dated Jul. 19, 2018, 15 pages.
"Non-Final Office Action", U.S. Appl. No. 15/142,829, dated Aug. 16, 2018, 15 pages.
"Notice of Allowance", U.S. Appl. No. 15/362,359, dated Aug. 3, 2018, 8 pages.
"Notice of Allowance", U.S. Appl. No. 14/874,955, dated Oct. 4, 2018, 8 pages.
"Notice of Allowance", U.S. Appl. No. 15/142,619, dated Aug. 13, 2018, 9 pages.
"Notice of Allowance", U.S. Appl. No. 15/595,649, dated Sep. 14, 2018, 8 pages.
"Notice of Allowance", U.S. Appl. No. 15/586,174, dated Sep. 24, 2018, 5 pages.
"Pre-Interview Communication", U.S. Appl. No. 15/286,495, dated Sep. 10, 2018, 4 pages.
"Pre-Interview Communication", U.S. Appl. No. 15/287,359, dated Jul. 24, 2018, 2 pages.
"Restriction Requirement", U.S. Appl. No. 15/286,537, dated Aug. 27, 2018, 8 pages.
"Final Office Action", U.S. Appl. No. 14/518,863, dated Apr. 5, 2018, 21 pages.
"Final Office Action", U.S. Appl. No. 14/504,139, dated May 1, 2018, 14 pages.
"Final Office Action", U.S. Appl. No. 15/595,649, dated May 23, 2018, 13 pages.
"Final Office Action", U.S. Appl. No. 15/142,689, dated Jun. 1, 2018, 16 pages.
"Final Office Action", U.S. Appl. No. 14/874,955, dated Jun. 11, 2018, 9 pages.
"Final Office Action", U.S. Appl. No. 14/959,901, dated Jun. 15, 2018, 21 pages.
"Final Office Action", U.S. Appl. No. 15/286,152, dated Jun. 26, 2018, 25 pages.
"Final Office Action", U.S. Appl. No. 15/267,181, dated Jun. 7, 2018, 31 pages.
"First Action Interview Office Action", U.S. Appl. No. 15/166,198, dated Apr. 25, 2018, 8 pages.
"Foreign Office Action", European Application No. 16784352.3, dated May 16, 2018, 3 pages.
"Foreign Office Action", Chinese Application No. 201721290290.3, dated Jun. 6, 2018, 3 pages.
"Non-Final Office Action", U.S. Appl. No. 15/287,253, dated Apr. 5, 2018, 17 pages.
"Non-Final Office Action", U.S. Appl. No. 15/586,174, dated Jun. 18, 2018, 7 pages.
"Notice of Allowance", U.S. Appl. No. 14/862,409, dated Jun. 6, 2018, 7 pages.
"Pre-Interview Communication", U.S. Appl. No. 15/362,359, dated May 17, 2018, 4 pages.
"Preliminary Report on Patentability", PCT Application No. PCT/US2016/055671, dated Apr. 10, 2018, 9 pages.
"Written Opinion", PCT Application No. PCT/US2017/032733, dated Jul. 24, 2017, 5 pages.
"Corrected Notice of Allowance", U.S. Appl. No. 14/312,486, dated Oct. 28, 2016, 4 pages.

"International Search Report and Written Opinion", Application No. PCT/US2016/024289, dated Aug. 25, 2016, 17 pages.
"Non-Final Office Action", U.S. Appl. No. 14/518,863, dated Oct. 14, 2016, 16 pages.
"Notice of Allowance", U.S. Appl. No. 14/312,486, dated Oct. 7, 2016, 15 pages.
"Notice of Allowance", U.S. Appl. No. 14/582,896, dated Nov. 7, 2016, 5 pages.
"Pre-Interview Communication", U.S. Appl. No. 14/513,875, dated Oct. 21, 2016, 3 pages.
Cheng,"Smart Textiles: From Niche to Mainstream", IEEE Pervasive Computing, Jul. 2013, pp. 81-84.
Farringdon,"Wearable Sensor Badge & Sensor Jacket for Context Awareness", Third International Symposium on Wearable Computers, Oct. 1999, 7 pages.
Pu,"Gesture Recognition Using Wireless Signals", Oct. 2014, pp. 15-18.
Schneegass,"Towards a Garment OS: Supporting Application Development for Smart Garments", Wearable Computers, ACM, Sep. 2014, 6 pages.
"Combined Search and Examination Report", GB Application No. 1620891.0, dated May 31, 2017, 9 pages.
"Final Office Action", U.S. Appl. No. 15/398,147, dated Jun. 30, 2017, 11 pages.
"Final Office Action", U.S. Appl. No. 14/874,955, dated Jun. 30, 2017, 9 pages.
"Final Office Action", U.S. Appl. No. 14/959,799, dated Jul. 19, 2017, 12 pages.
"Final Office Action", U.S. Appl. No. 14/504,121, dated Aug. 8, 2017, 16 pages.
"International Search Report and Written Opinion", Application No. PCT/US2016/063874, dated May 11, 2017, 19 pages.
"Non-Final Office Action", U.S. Appl. No. 14/862,409, dated Jun. 22, 2017, 15 pages.
"Non-Final Office Action", U.S. Appl. No. 14/959,730, dated Jun. 23, 2017, 14 pages.
"Notice of Allowance", U.S. Appl. No. 14/513,875, dated Jun. 28, 2017, 7 pages.
"Notice of Allowance", U.S. Appl. No. 15/343,067, dated Jul. 27, 2017, 9 pages.
"Notice of Allowance", U.S. Appl. No. 14/504,038, dated Aug. 7, 2017, 17 pages.
"Corrected Notice of Allowance", U.S. Appl. No. 14/582,896, dated Feb. 23, 2017, 2 pages.
"International Preliminary Report on Patentability", Application No. PCT/US2015/043963, dated Feb. 16, 2017, 12 pages.
"International Preliminary Report on Patentability", Application No. PCT/US2015/030388, dated Dec. 15, 2016, 12 pages.
"International Preliminary Report on Patentability", Application No. PCT/US2015/043949, dated Feb. 16, 2017, 13 pages.
"International Preliminary Report on Patentability", Application No. PCT/US2015/044774, dated Mar. 2, 2017, 8 pages.
"International Search Report and Written Opinion", Application No. PCT/US2016/062082, dated Feb. 23, 2017, 12 pages.
"International Search Report and Written Opinion", Application No. PCT/US2016/055671, dated Dec. 1, 2016, 14 pages.
"Non-Final Office Action", U.S. Appl. No. 14/513,875, dated Feb. 21, 2017, 9 pages.
"Non-Final Office Action", U.S. Appl. No. 14/874,955, dated Feb. 27, 2017, 8 pages.
"Non-Final Office Action", U.S. Appl. No. 15/398,147, dated Mar. 9, 2017, 10 pages.
"Pre-Interview Communication", U.S. Appl. No. 14/959,730, dated Feb. 15, 2017, 3 pages.
"Corrected Notice of Allowance", U.S. Appl. No. 14/312,486, dated Jan. 23, 2017, 4 pages.
"Corrected Notice of Allowance", U.S. Appl. No. 14/504,061, dated Dec. 27, 2016, 2 pages.
"Corrected Notice of Allowance", U.S. Appl. No. 14/582,896, dated Feb. 6, 2017, 2 pages.
"Corrected Notice of Allowance", U.S. Appl. No. 14/582,896, dated Dec. 19, 2016, 2 pages.

(56) References Cited

OTHER PUBLICATIONS

"Non-Final Office Action", U.S. Appl. No. 14/504,121, dated Jan. 9, 2017, 13 pages.
"Non-Final Office Action", U.S. Appl. No. 14/504,139, dated Jan. 27, 2017, 10 pages.
"Non-Final Office Action", U.S. Appl. No. 14/959,799, dated Jan. 27, 2017, 10 pages.
"Notice of Allowance", U.S. Appl. No. 14/930,220, dated Feb. 2, 2017, 8 pages.
"Pre-Interview Communication", U.S. Appl. No. 14/494,863, dated Jan. 27, 2017, 5 pages.
"Pre-Interview Communication", U.S. Appl. No. 14/959,901, dated Feb. 10, 2017, 3 pages.
"Final Office Action", U.S. Appl. No. 15/142,619, dated Feb. 8, 2018, 15 pages.
"Final Office Action", U.S. Appl. No. 15/093,533, dated Mar. 21, 2018, 19 pages.
"First Action Interview Office Action", U.S. Appl. No. 15/286,152, dated Mar. 1, 2018, 5 pages.
"Foreign Office Action", Chinese Application No. 201721290290.3, dated Mar. 9, 2018, 2 pages.
"Non-Final Office Action", U.S. Appl. No. 15/267,181, dated Feb. 8, 2018, 29 pages.
"Non-Final Office Action", U.S. Appl. No. 14/874,955, dated Feb. 8, 2018, 7 pages.
"Notice of Allowance", U.S. Appl. No. 14/959,730, dated Feb. 22, 2018, 8 pages.
"Pre-Interview Communication", U.S. Appl. No. 15/166,198, dated Mar. 8, 2018, 8 pages.
"Pre-Interview First Office Action", U.S. Appl. No. 15/286,152, dated Feb. 8, 2018, 4 pages.
"Final Office Action", U.S. Appl. No. 15/286,512, dated Dec. 26, 2018, 15 pages.
"International Preliminary Report on Patentability", PCT Application No. PCT/US2017/032733, dated Nov. 29, 2018, 7 pages.
"Non-Final Office Action", U.S. Appl. No. 14/959,901, dated Oct. 11, 2018, 22 pages.
"Non-Final Office Action", U.S. Appl. No. 15/286,152, dated Oct. 19, 2018, 27 pages.
"Non-Final Office Action", U.S. Appl. No. 15/286,837, dated Oct. 26, 2018, 10 pages.
"Non-Final Office Action", U.S. Appl. No. 15/286,537, dated Nov. 19, 2018, 18 pages.
"Non-Final Office Action", U.S. Appl. No. 15/287,155, dated Dec. 10, 2018, 12 pages.
"Notice of Allowance", U.S. Appl. No. 15/142,689, dated Oct. 30, 2018, 9 pages.
"Notice of Allowance", U.S. Appl. No. 15/287,200, dated Nov. 6, 2018, 19 pages.
"Written Opinion", PCT Application No. PCT/US2017/051663, dated Oct. 12, 2018, 8 pages.
"Apple Watch Used Four Sensors to Detect your Pulse", retrieved from http://www.theverge.com/2014/9/9/6126991 / apple-watch-four-back-sensors-detect-activity on Sep. 23, 2017 as cited in PCT search report for PCT Application No. PCT/US2016/026756 dated Nov. 10, 2017; The Verge, paragraph 1, Sep. 9, 2014, 4 pages.
"Clever Toilet Checks on Your Health", CNN.Com; Technology, Jun. 28, 2005, 2 pages.
"Final Office Action", U.S. Appl. No. 14/681,625, dated Dec. 7, 2016, 10 pages.
"Final Office Action", U.S. Appl. No. 14/731,195, dated Oct. 11, 2018, 12 pages.
"Final Office Action", U.S. Appl. No. 14/715,454, dated Sep. 7, 2017, 14 pages.
"Final Office Action", U.S. Appl. No. 14/720,632, dated Jan. 9, 2018, 18 pages.
"Final Office Action", U.S. Appl. No. 14/715,454, dated Apr. 17, 2018, 19 pages.
"Final Office Action", U.S. Appl. No. 14/599,954, dated Aug. 10, 2016, 23 pages.

"Final Office Action", U.S. Appl. No. 14/699,181, dated May 4, 2018, 41 pages.
"Final Office Action", U.S. Appl. No. 14/715,793, dated Sep. 12, 2017, 7 pages.
"Final Office Action", U.S. Appl. No. 14/809,901, dated Dec. 13, 2018, 7 pages.
"First Action Interview OA", U.S. Appl. No. 14/715,793, dated Jun. 21, 2017, 3 pages.
"First Action Interview Office Action", U.S. Appl. No. 15/142,471, dated Feb. 5, 2019, 29 pages.
"First Action Interview Office Action", U.S. Appl. No. 14/731,195, dated Jun. 21, 2018, 4 pages.
"First Action Interview Pilot Program Pre-Interview Communication", U.S. Appl. No. 14/731,195, dated Aug. 1, 2017, 3 pages.
"First Examination Report", GB Application No. 1621332.4, dated May 16, 2017, 7 pages.
"Foreign Office Action", Chinese Application No. 201580034536.8, dated Oct. 9, 2018.
"Foreign Office Action", KR Application No. 10-2016-7036023, dated Aug. 11, 2017, 10 pages.
"Foreign Office Action", Chinese Application No. 201580036075.8, dated Jul. 4, 2018, 14 page.
"Foreign Office Action", JP App. No. 2016-567813, dated Jun. 16, 2018, 3 pages.
"Foreign Office Action", Japanese Application No. 2016-567839, dated Apr. 3, 2018, 3 pages.
"Foreign Office Action", KR Application No. 10-2016-7035397, dated Sep. 20, 2017, 5 pages.
"Foreign Office Action", Korean Application No. 1020187012629, dated May 24, 2018, 6 pages.
"Foreign Office Action", EP Application No. 15170577.9, dated May 30, 2017, 7 pages.
"Foreign Office Action", Korean Application No. 10-2016-7036396, dated Jan. 3, 2018, 7 pages.
"Foreign Office Action", JP Application No. 2016567813, dated Sep. 22, 2017, 8 pages.
"Foreign Office Action", Japanese Application No. 2018021296, dated Dec. 25, 2018, 8 pages.
"Foreign Office Action", EP Application No. 15754323.2, dated Mar. 9, 2018, 8 pages.
"Foreign Office Action ", CN Application No. 201580034908.7, dated Jul. 3, 2018, 12 pages.
"International Preliminary Report on Patentability", PCT Application No. PCT/US2016/026756, dated Oct. 10, 2017, 8 pages.
"International Search Report and Written Opinion", PCT Application No. PCT/US2016/065295, dated Mar. 14, 2017, 5 pages.
"International Search Report and Written Opinion", Application No. PCT/US2016/042013, dated Oct. 26, 2016, 12 pages.
"International Search Report and Written Opinion", Application No. PCT/US2016/034366, dated Nov. 17, 2016, 13 pages.
"International Search Report and Written Opinion", Application No. PCT/US2016/033342, dated Oct. 27, 2016, 20 pages.
"Life:X Lifestyle eXplorer", Retrieved from <https://web.archive.org/web/20150318093841/http://research.microsoft.com/en-us/projects/lifex >, Feb. 3, 2017, 2 pages.
"Non-Final Office Action", U.S. Appl. No. 15/596,702, dated Jan. 4, 2019, 10 pages.
"Non-Final Office Action", U.S. Appl. No. 14/666,155, dated Feb. 3, 2017, 12 pages.
"Non-Final Office Action", U.S. Appl. No. 14/809,901, May 24, 2018, 13 pages.
"Non-Final Office Action", U.S. Appl. No. 14/720,632, dated Jun. 14, 2017, 16 pages.
"Non-Final Office Action", U.S. Appl. No. 14/715,454, dated Jan. 11, 2018, 16 pages.
"Non-Final Office Action", U.S. Appl. No. 14/599,954, dated Jan. 26, 2017, 16 pages.
"Non-Final Office Action", U.S. Appl. No. 14/599,954, dated Feb. 2, 2016, 17 pages.
"Non-Final Office Action", U.S. Appl. No. 14/720,632, May 18, 2018, 20 pages.
"Non-Final Office Action", U.S. Appl. No. 14/699,181, dated Oct. 18, 2017, 33 pages.

(56) References Cited

OTHER PUBLICATIONS

"Non-Final Office Action", U.S. Appl. No. 14/681,625, dated Mar. 6, 2017, 7 pages.
"Non-Invasive Quantification of Peripheral Arterial Volume Distensibilitiy and its Non-Lineaer Relationship with Arterial Pressure", Journal of Biomechanics, Pergamon Press, vol. 42, No. 8; as cited in the search report for PCT/US2016/013968 citing the whole document, but in particular the abstract, dated May 29, 2009, 2 pages.
"Notice of Allowance", U.S. Appl. No. 14/599,954, dated May 24, 2017, 11 pages.
"Notice of Allowance", U.S. Appl. No. 14/715,793, dated Jul. 6, 2018, 5 pages.
"Notice of Allowance", U.S. Appl. No. 15/286,495, dated Jan. 17, 2019, 5 pages.
"Notice of Allowance", U.S. Appl. No. 15/595,649, dated Jan. 3, 2019, 5 pages.
"Notice of Allowance", U.S. Appl. No. 14/715,793, dated Dec. 18, 2017, 5 pages.
"Notice of Allowance", U.S. Appl. No. 14/666,155, dated Feb. 20, 2018, 5 pages.
"Notice of Allowance", U.S. Appl. No. 14/666,155, dated Jul. 10, 2017, 7 pages.
"Notice of Allowance", U.S. Appl. No. 14/681,625, dated Jun. 7, 2017, 7 pages.
"Notice of Allowance", U.S. Appl. No. 14/681,625, dated Oct. 23, 2017, 8 pages.
"Notice of Allowance", U.S. Appl. No. 15/142,829, dated Feb. 6, 2019, 8 pages.
"Notice of Allowance", U.S. Appl. No. 14/504,137, dated Feb. 6, 2019, 9 pages.
"Pre-Interview Communication", U.S. Appl. No. 15/142,471, dated Dec. 12, 2018, 3 pages.
"Pre-Interview Communication", U.S. Appl. No. 14/715,793, dated Mar. 20, 2017, 3 pages.
"Pre-Interview Communication", U.S. Appl. No. 14/715,454, dated Apr. 14, 2017, 3 pages.
"Pre-Interview Office Action", U.S. Appl. No. 14/731,195, dated Dec. 20, 2017, 4 pages.
"Preliminary Report on Patentability", PCT Application No. PCT/US2016/065295, dated Jul. 24, 2018, 18 pages.
"Preliminary Report on Patentability", PCT Application No. PCT/US2016/042013, dated Jan. 30, 2018, 7 pages.
"Preliminary Report on Patentability", PCT Application No. PCT/US2016/032307, dated Dec. 7, 2017, 9 pages.
"Pressure-Volume Loop Analysis in Cardiology", retrieved from https://en.wikipedia.org/w/index.php?title=Pressure-volume loop analysis in card iology&oldid=636928657 on Sep. 23, 2017; Obtained per link provided in search report from PCT/US2016/01398 dated Jul. 28, 2016, Dec. 6, 2014, 10 pages.
"Restriction Requirement", U.S. Appl. No. 15/462,957, dated Jan. 4, 2019, 6 pages.
"Restriction Requirement", U.S. Appl. No. 15/352,194, dated Feb. 6, 2019, 8 pages.
"The Dash smart earbuds play back music, and monitor your workout", Retrieved from < http://newatlas.com/bragi-dash-tracking-earbuds/30808/>, Feb. 13, 2014, 3 pages.
"Thermofocus No Touch Forehead Thermometer", Technimed, Internet Archive. Dec. 24, 2014. https://web.archive.org/web/20141224070848/http://www.tecnimed.it:80/thermofocus-forehead-thermometer-H1N1-swine-flu.html, Dec. 24, 2018, 4 pages.
"Written Opinion", PCT Application No. PCT/US2016/042013, dated Feb. 2, 2017, 6 pages.
"Written Opinion", PCT Application No. PCT/US2016/026756, dated Nov. 10, 2016, 7 pages.
"Written Opinion", PCT Application No. PCT/US2016/065295, dated Apr. 13, 2018, 8 pages.
"Written Opinion", PCT Application PCT/US2016/013968, dated Jul. 28, 2016, 9 pages.

Duncan, David P. "Motion Compensation of Synthetic Aperture Radar", Microwave Earth Remote Sensing Laboratory, Brigham Young University, Apr. 15, 2003, 5 pages.
Ishijima, Masa "Unobtrusive Approaches to Monitoring Vital Signs at Home", Medical & Biological Engineering and Computing, Springer, Berlin, DE, vol. 45, No. 11 as cited in search report for PCT/US2016/013968 dated Jul. 28, 2016, Sep. 26, 2007, 3 pages.
Klabunde, Richard E. "Ventricular Pressure-Volume Loop Changes in Valve Disease", Retrieved From <https://web.archive.org/web/20101201185256/http://cvphysiology.com/Heart%20Disease/HD009.htm>, Dec. 1, 2010, 8 pages.
Matthews, Robert J. "Venous Pulse", Retrieved at: http://www.rjmatthewsmd.com/Definitions/venous_pulse.htm—on Nov. 30, 2016, Apr. 13, 2013, 7 pages.
Otto, Chris et al., "System Architecture of a Wireless Body Area Sensor Network for Ubiquitous Health Monitoring", Journal of Mobile Multimedia; vol. 1, No. 4, Jan. 10, 2006, 20 pages.
Palese, et al., "The Effects of Earphones and Music on the Temperature Measured by Infrared Tympanic Thermometer: Preliminary Results", ORL-head and neck nursing: official journal of the Society of Otorhinolaryngology and Head-Neck Nurses 32.2, Jan. 1, 2013, pp. 8-12.
Pu, Qifan et al., "Whole-Home Gesture Recognition Using Wireless Signals", MobiCom'13, Sep. 30-Oct. 4, Miami, FL, USA, 2013, 12 pages.
Pu, Qifan et al., "Whole-Home Gesture Recognition Using Wireless Signals", Proceedings of the 19th annual international conference on Mobile computing & networking (MobiCom'13), US, ACM, Sep. 30, 2013, pp. 27-38, Sep. 30, 2013, 12 pages.
Zhadobov, Maxim et al., "Millimeter-Wave Interactions with the Human Body: State of Knowledge and Recent Advances", International Journal of Microwave and Wireless Technologies, p. 1 of 11, Cambridge University Press and the European Microwave Association, 2011, doi:10.1017/S1759078711000122, 2011.
"Final Office Action", U.S. Appl. No. 15/287,155, dated Apr. 10, 2019, 11 pages.
"Final Office Action", U.S. Appl. No. 15/286,537, dated Apr. 19, 2019, 21 pages.
"Final Office Action", U.S. Appl. No. 15/287,253, dated Apr. 2, 2019, 10 pages.
"Foreign Office Action", Japanese Application No. 2018501256, dated Feb. 26, 2019, 3 pages.
"Non-Final Office Action", U.S. Appl. No. 15/166,198, dated Feb. 21, 2019, 48 pages.
"Non-Final Office Action", U.S. Appl. No. 15/287,394, dated Mar. 22, 2019, 39 pages.
"Non-Final Office Action", U.S. Appl. No. 16/238,464, dated Mar. 7, 2019, 15 pages.
"Notice of Allowance", U.S. Appl. No. 15/286,152, dated Mar. 5, 2019, 23 pages.
"Notice of Allowance", U.S. Appl. No. 15/286,837, dated Mar. 6, 2019, 7 pages.
"Notice of Allowance", U.S. Appl. No. 15/703,511, dated Apr. 16, 2019, 5 pages.
"Notice of Allowance", U.S. Appl. No. 15/286,512, dated Apr. 9, 2019, 14 pages.
"Pre-Interview Communication", U.S. Appl. No. 15/917,238, dated May 1, 2019, 6 pages.
"Pre-Interview Communication", U.S. Appl. No. 15/703,511, dated Feb. 11, 2019, 5 pages.
"Final Office Action", U.S. Appl. No. 14/959,901, dated May 30, 2019, 18 pages.
"Final Office Action", U.S. Appl. No. 15/142,471, dated Jun. 20, 2019, 26 pages.
"Final Office Action", U.S. Appl. No. 16/238,464, dated Jul. 25, 2019, 15 pages.
"First Action Interview Office Action", U.S. Appl. No. 15/917,238, Jun. 6, 2019, 6 pages.
"Foreign Office Action", Korean Application No. 10-2016-7036015, Oct. 15, 2018, 3 pages.
"International Preliminary Report on Patentability", PCT Application No. PCT/US2017/051663, Jun. 20, 2019, 10 pages.

(56) References Cited

OTHER PUBLICATIONS

"Non-Final Office Action", U.S. Appl. No. 15/424,263, dated May 23, 2019, 12 pages.
"Non-Final Office Action", U.S. Appl. No. 15/462,957, dated May 24, 2019, 14 pages.
"Notice of Allowance", U.S. Appl. No. 15/352,194, dated Jun. 26, 2019, 8 pages.
"Notice of Allowance", U.S. Appl. No. 15/287,155, dated Jul. 25, 2019, 7 pages.
Kubota, et al., "A Gesture Recognition Approach by using Microwave Doppler Sensors", IPSJ SIG Technical Report, 2009 (6), Information Processing Society of Japan, Apr. 15, 2010, pp. 1-8, Apr. 15, 2010, 12 pages.
"Final Office Action", U.S. Appl. No. 15/287,394, dated Sep. 30, 2019, 38 Pages.
"Non-Final Office Action", U.S. Appl. No. 15/286,537, dated Sep. 3, 2019, 28 Pages.
"Non-Final Office Action", U.S. Appl. No. 15/791,044, dated Sep. 30, 2019, 22 Pages.
"Notice of Allowance", U.S. Appl. No. 15/917,238, dated Aug. 21, 2019, 13 pages.
"Notice of Allowance", U.S. Appl. No. 16/389,402, dated Aug. 21, 2019, 7 Pages.
"Notice of Allowance", U.S. Appl. No. 15/287,253, dated Aug. 26, 2019, 13 Pages.
"Notice of Allowance", U.S. Appl. No. 16/356,748, dated Oct. 17, 2019, 9 Pages.

\* cited by examiner

RADAR-BASED AUTHENTICATION

PRIORITY

This application claims priority to U.S. Provisional Patent Application Ser. No. 62/237,975 filed on Oct. 6, 2015, the disclosure of which is incorporated by reference herein in its entirety.

BACKGROUND

This background description is provided for the purpose of generally presenting the context of the disclosure. Unless otherwise indicated herein, material described in this section is neither expressly nor impliedly admitted to be prior art to the present disclosure or the appended claims.

As computing devices evolve with more computing power, they are able to evolve how they receive input commands or information. One type of evolving input mechanism relates to capturing user gestures. For instance, a user can attach a first peripheral device to their arm or hand that reads muscle activity, or hold a second peripheral device that contains an accelerometer that detects motion. In turn, these peripherals then communicate with a receiving computing device based upon a detected gesture. With these types of peripheral devices, a user physically connects the peripheral device to a corresponding body part that performs the gesture. However, this constrains the user, in that the user must not only acquire these peripheral devices, but must couple them to the receiving computing device. Thus, it would be advantageous to capture various gestures without attaching a peripheral device to the user.

Further, a computing device may allow a user to authenticate themselves in a variety of different ways in order to access the device or applications executing on the device, such as by gesturing or entering a password to unlock a laptop, receiving fingerprint sensor data to unlock a smartphone, using a microphone to recognize the user's voice, using a camera to recognize the user's face, and so forth. However, in many cases, the user would like to be authenticated without touching the device, or to be authenticated without any type of active interaction with the device to allow for seamless access to devices and applications, while at the same time preventing certain people from access. One way to authenticate users includes using a camera to capture video or photos of a user. However, using a camera to authenticate users may result in a loss of privacy for users who do not wish, or expect, that their photo will be captured.

SUMMARY

This document describes techniques and devices for radar-based authentication. The techniques describe a radar-based authentication component that is configured to recognize biometric characteristics associated with a person or gestures performed by the person. Then, by comparing the biometric characteristics or gestures with an authentication library, an authentication state may be determined which allows or restricts access to a device or application. This Summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Various aspects of radar-based authentication are described with reference to the following drawings. The same numbers are used throughout the drawings to reference like features and components.

DETAILED DESCRIPTION

Overview

Figure 1:
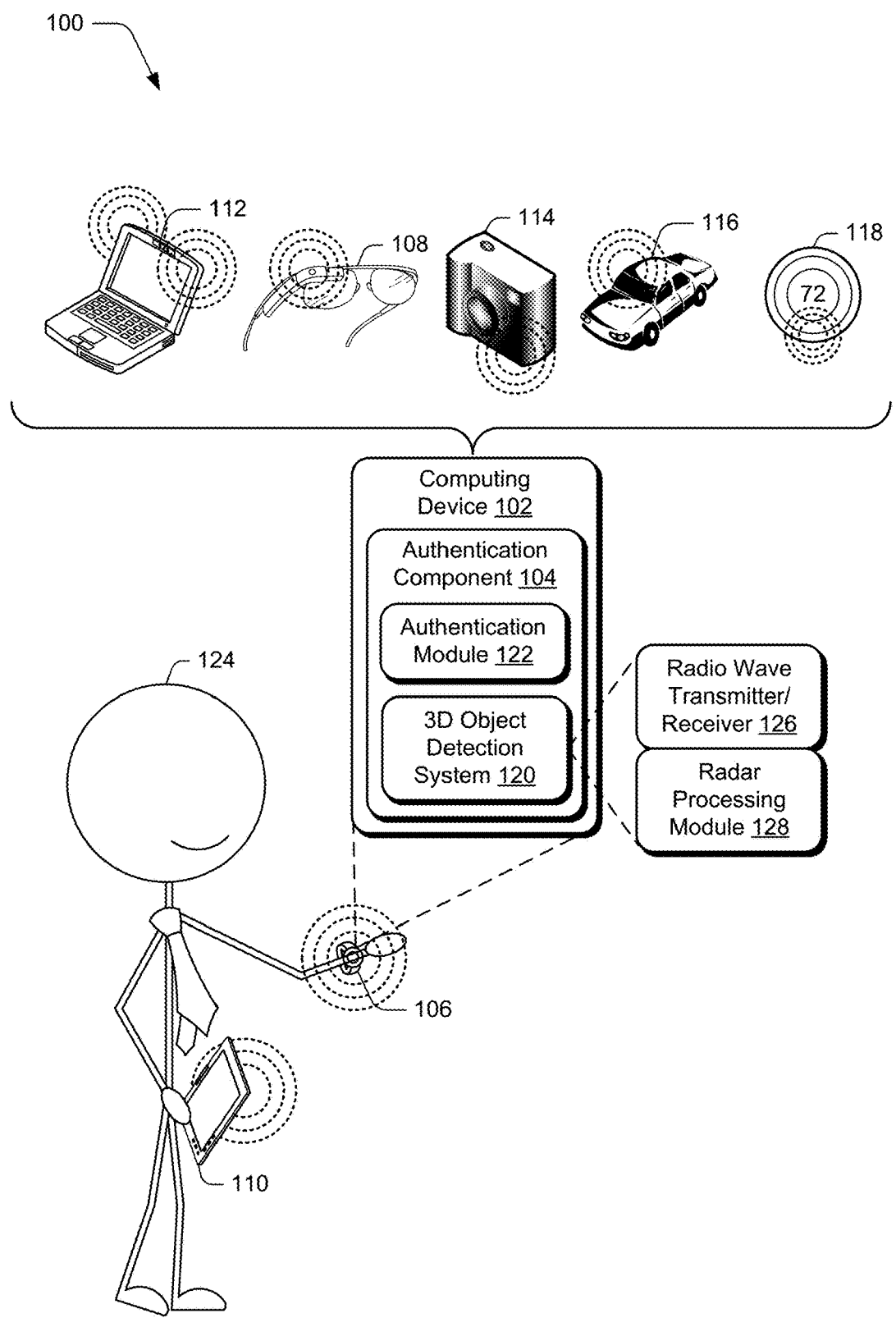
FIG. 1 is an illustration of an environment in an example implementation that is operable to employ radar-based authentication techniques described herein.

This document describes techniques and devices for radar-based authentication. The techniques describe a radar-based authentication component that is configured to recognize biometric characteristics associated with a person, and to determine an authentication state, based on the recognized biometric characteristics, which allows or restricts access to a device or application. Thus, a person can be authenticated even without the person's active engagement.

As described herein, biometric characteristics correspond to distinctive, measurable characteristics that can be used to identify a particular known person, or a particular "type" of person (e.g., an adult versus a child). Biometric characteristics are often categorized as physiological versus behavioral characteristics. Physiological characteristics are related to the shape of the body and may include, by way of example and not limitation, height, skeletal structure, fingerprint, palm veins, face recognition, DNA, palm print, hand geometry, iris recognition, retina scent, heart conditions, and so forth. Behavioral characteristics are related to the pattern of behavior of a person, including but not limited to a walking gait, typing rhythm, and so forth.

Alternately or additionally, the authentication component can be configured to recognize a gesture (or series of gestures) by the person, and to determine the authentication state based on the gesture. Thus, in this implementation, the user actively engages and interacts with the authentication component in order to be authenticated. In some cases, a two-stage authentication process may be applied, whereby the authentication component authenticates a person based on biometric characteristics as well as detection of one or more recognized gestures performed by the person.

In order to provide radar-based authentication techniques, the authentication component incorporates techniques usable to detect biometric characteristics and/or gestures that can be compared to an authentication library in order to authenticate the person to various types of applications or devices. For instance, a three-dimensional object detection system may be employed in which object characteristics are detected in free space, without any attachment or peripheral device connected to a corresponding body part, such as a hand. The three-dimensional object detection system, for instance, may leverage transmission and reception of radio signals to detect orientation and movement of an object in three-dimensional space. Such movement, for example, could include movement of a person's body (e.g., the person's walking gait), or movement of a single body part (e.g., gestures performed by movement of a person's hand).

Inputs resulting from this detection are then processed by leveraging an authentication library of the authentication component. The authentication library, for instance, may define gestures as well as biometric characteristics of a person (e.g., height, skeletal structure, or walking gait) that are detectable and correspond to various authentication states which enable or restrict access to various devices or applications. Accordingly, the object characteristics of the inputs may be compared to the authentication library to recognize corresponding object characteristics maintained in the library, and an authentication state corresponding to the recognized object characteristics.

For example, the authentication component can accurately recognize gestures or a series of gestures that are made in three dimensions, such as in-the-air gestures. Based on a comparison with the authentication library, the gestures can be recognized as a pre-configured unlock gesture or other input to authenticate a person, such that the person is permitted to access a device or application. These in-the-air gestures can be made from varying distances, such as from a person sitting on a couch to control a television, a person standing in a kitchen to control an oven or refrigerator, or millimeters from a desktop computer's display.

Alternately or additionally, the authentication component can be used to recognize biometric characteristics of a person. In some cases, the recognized biometric characteristics of the person can be used to determine that the person is a particular known person. For example, the authentication component can accurately identify a person based on biometric characteristics of the person, such as the person's height, skeletal structure, facial shape, hair, walking gait, and so forth. By so doing, the authentication component may determine that a person is a particular known person that is listed in the authentication library. Alternately, the authentication component can identify a person as a particular "type" of person, thereby differentiating the person from other types of persons. For example, a person could be recognized as an "adult" and differentiated from a "child", based on the detection of biometric characteristics such as height or skeletal structure.

An authentication state is then initiated as a result of this comparison. Generally, an authentication state either permits or restricts access to a device or application. A series of gestures, for instance, may be detected by the authentication component and compared to the authentication library to determine an authentication state. If the series of gestures match a particular authentication state in which access to a device or application is permitted, then the authentication component may initiate the authentication state, such as by causing the computing device to transition from a locked state to an unlocked state.

As another example, biometric characteristics of a person may be detected by the authentication component and compared to the authentication library to determine an authentication state. If the biometric characteristics of the person match a particular known person and correspond to an authentication state, then the authentication component may initiate the authentication state, such as by causing the computing device to permit access to the person. Alternately, if the person is not recognized as a particular known person, the authentication component may initiate the authentication state by restricting access to the person. Similarly, if the biometric characteristics are recognized as corresponding to a particular type of person, then the authentication component may initiate an associated authentication state, such as by enabling access to the computing device if the person is recognized as an adult, but preventing the access if the person is recognized as a child. In this way, young children may be prevented from accessing certain devices or dangerous objects.

Notably, the radar-based authentication techniques described herein can authenticate a person at approximately the same resolution as a camera. However, unlike a camera, radar does not actually "see" a person, and thus the person's privacy is not violated in many cases. As such, these types of systems can be implemented in places where cameras are not permitted or expected by users.

Example Environment

FIG. 1 is an illustration of an environment 100 in an example implementation that is operable to employ radar-based authentication techniques described herein. The illustrated environment 100 includes a computing device 102, which is configurable in a variety of ways and includes an authentication component 104.

The computing device 102, for instance, may be configured as a wearable device having a housing that is configured to be worn by or attached to a user. As such, the housing of the wearable device 106 may take a variety of different forms, such as a ring, broach, pendant, configured to be worn on a wrist of a user as illustrated, glasses as illustrated at 108, and so forth. The computing device 102 may also be configured to include a housing configured to be held by one or more hands of a user, such as a mobile phone or tablet as illustrated at 110, a laptop 112 computer, a dedicated camera 114, and so forth. Other examples include incorporation of the computing device 102 as part of a vehicle 116 (e.g., plane, train, boat, aircraft, and balloon), as part of the "Internet-of-things" such as a thermostat 118, appliance, vent, furnace, and so forth. Additional forms of computing devices 102 include desktop computers, game consoles, media consumption devices, televisions, and so on.

Thus, the computing device 102 ranges from full resource devices with substantial memory and processor resources (e.g., personal computers, game consoles) to a low-resource device with limited memory and/or processing resources (e.g., wearables). Although single computing device examples are shown, a computing device may be representative of a plurality of different devices (e.g., a television and remote control) as further described in relation to FIG. 10.

The computing device 102, regardless of configuration, is configured to include an authentication component 104 to initiate various authentication states based on the detection of one or more biometric characteristics of a person or gestures performed by the person. The authentication component 104 in the illustrated example includes a three dimensional (3D) object detection system 120 and an authentication module 122 that is implemented at least partially in hardware. The authentication component 104 is representative of functionality to identify gestures made by a person 124 (e.g., either directly by the person and/or with an object) as well as biometric characteristics of the person 124 (e.g., height, skeletal structure, or walking gait), and to transition to various authentication states. For example, the authentication module 122 may receive inputs from the 3D object detection system 120 that are usable to detect characteristics or attributes to identify an object (e.g., person 124), orientation of the object, and/or movement of the object. Based on recognition of a combination of one or more of the characteristics or attributes, the authentication module 122 may initiate an authentication state, such as to detect a series of gestures by a hand of person 124 and cause a user interface output by the computing device 102 to transition from displaying a "lockscreen" to displaying a home screen. As another example, authentication module 122 may recognize person 124 as a particular known person based on a detected height and walking gait of the person and unlock the door of the person's house or car.

The 3D object detection system 120 is configurable to detect objects in three dimensions, such as to identify the object, an orientation of the object, and/or movement of the object. The detection may be performed using a variety of different techniques, such as cameras (e.g., a time-of-flight camera), sound waves, and so on. In the illustrated example, the 3D object detection system 120 is configured to use radar techniques and radio waves through use of a radio wave transmitter/receiver 126 and a radar processing module 128. The radio wave transmitter/receiver 126, for instance, transmits radio waves in the radio frequency range corresponding to one or more Wi-Fi frequency bands, e.g., IEEE 802.11 and so forth. The radar processing module 128 then detects return of these radio waves to detect objects, which may be performed at a resolution of less than one centimeter as further described beginning in relation to FIG. 4 in the following.

Through use of radio waves, the 3D object detection system 120 may detect objects that are located behind other objects, e.g., are least partially obscured from "view" by another object. The 3D object detection system 120 may also transmit through materials such as fabric and plastics and even through a housing of the computing device 102 itself such that the housing may be made with lower cost and increased protection against outside elements. These techniques may also be leveraged to detect gestures or biometric characteristics of person 124 while the computing device 102 is in the person's 124 pocket. Complementary detection techniques may also be used, such as for the radar processing module 128 to leverage inputs from a plurality of computing devices, such as a watch and phone as illustrated, to detect a gesture or biometric characteristics. In the following, a variety of gesture detection and biometric detection techniques are described, which may be implemented using radar or other object detection techniques.

Figure 2:
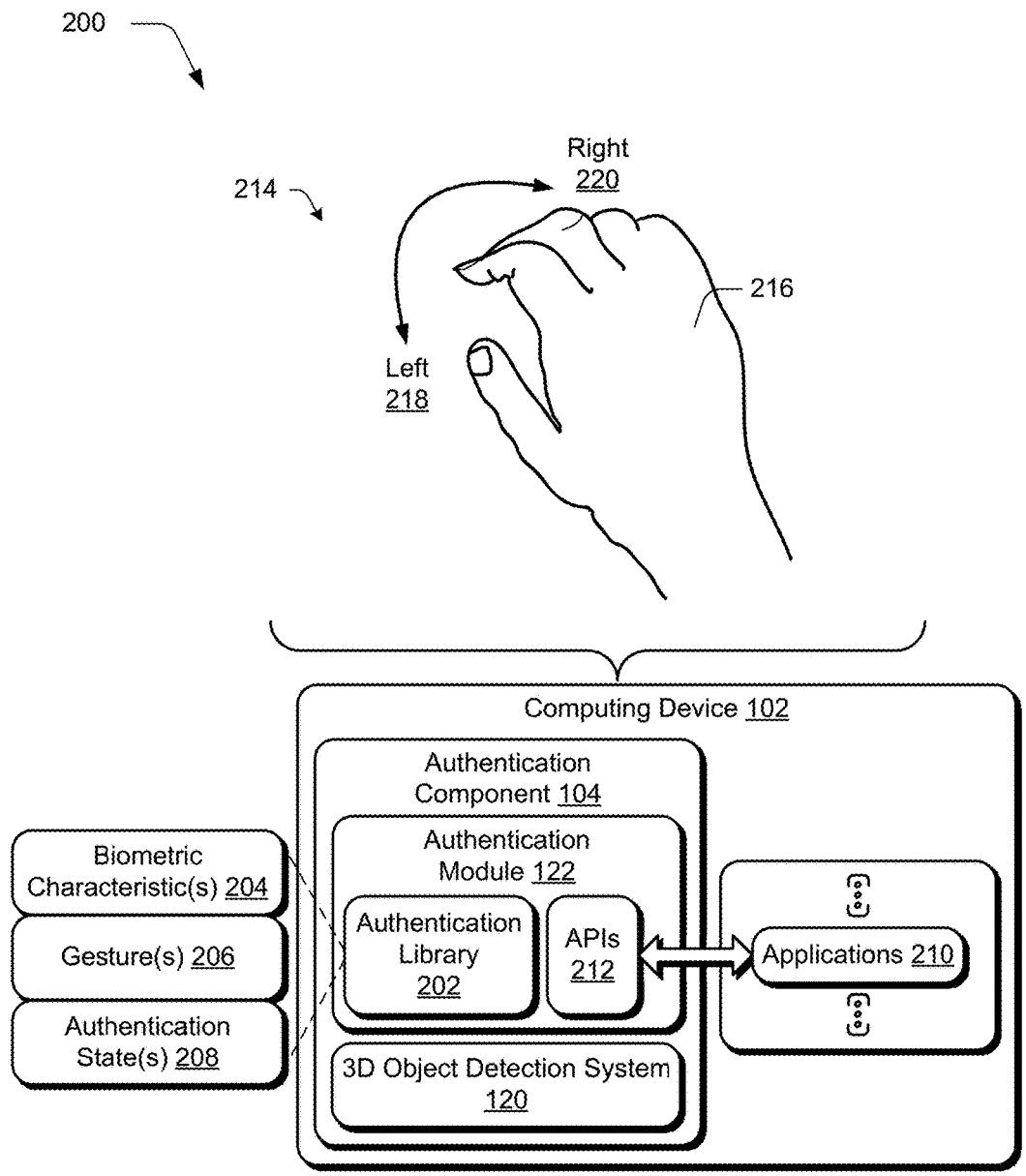
FIG. 2 depicts a system in an example implementation in which operation of the authentication component of FIG. 1 is shown in greater detail.

FIG. 2 depicts a system 200 in an example implementation in which operation of the authentication component 104 is shown in greater detail. In this example, the authentication module 122 employs an authentication library 202 that stores signal characteristics, or characteristics about a target object that are discernable from a signal, that can be used to identify a unique in-the-air gesture (or series of gestures), a person's identity (based on biometric characteristics), a person's presence, and so forth.

In this example, the authentication library 202 includes one or more biometric characteristics 204 of a person 124 or type of person and/or gestures 206 that are mapped to an authentication state 208. In some cases, the authentication library 202 may include pre-configured gestures 206 that are mapped to various authentication states 208. For instance, a specific gesture could be mapped to an authentication state which transitions a computing device from a "locked" state to an "unlocked" state. Similarly, biometric characteristics, such as a particular height threshold, can be mapped to an authentication state. Alternately or additionally, during an enrollment or registration process, biometric characteristics 204 or gesture characteristics 206 may be captured by the 3D object detection system 120 and mapped to an authentication state 208. For instance, biometric characteristics associated with person 124 can be captured and mapped to an authentication state that enables access to a device. In addition, certain data stored in authentication library 202 may be treated in one or more ways before it is stored or used, so that personally identifiable information is removed. For example, a person's identity may be treated so that no personally identifiable information can be determined for the person, or a person's geographic location may be generalized where location information is obtained (such as to a city, ZIP code, or state level), so that a particular location of a person cannot be determined. Thus, the person may have control over what information is collected about the person, how that information is used, and what information is provided to the person.

The authentication library 202 is usable by the authentication module 122 to recognize the one or more biometric characteristics 204 of a person 124 or gestures 206 performed by person 124, as well as the authentication state 208 that is mapped to the recognized gesture 206 or biometric characteristics 204.

The 3D object detection system 120, for instance, may detect an object (e.g., a body of person 124 or a specific part of the body of person 124) and movement of the object. Data that results from this detection is then used by the authentication module 122 to identify which of the biometric characteristics 204 or gestures 206 in the authentication library 202 correspond to the detected object characteristics, if any. From this, the authentication module 122 also identifies an authentication state 208 that corresponds to the recognized biometric characteristic 204 or gesture 206.

Based on this comparison, authentication module 122 initiates the recognized authentication state 208, if any, which permits or restricts access to computing device 102, applications 210 executing on computing device 102, or a remote devices or application. For example, a result of the comparison can be output by the authentication module 122 via one or more application programming interfaces 212 to applications 210 that are executable by the computing device 102, such as third-party applications, an operating system, and so forth. The applications 210, for instance, may then cause the transition to the recognized authentication state 208, such as by unlocking computing device 102 to enable user access.

For example, a gesture 214 is illustrated as being performed by a hand 216 of the person 124 of FIG. 1 that mimics the turning of a physical knob. Detection of the gesture 214 by the 3D object detection system 120 includes positioning of fingers of the person's 124 hand 216 in three-dimensional space as well as detection of movement, which in this instance involves rotational movement to the left 218 or right 220.

The authentication module 122 accepts data as an input from the 3D object detection system 120 that describes this positioning and movement. This data is then compared with the biometric characteristics 204 or gestures 206 stored in the authentication library 202 to recognize the gesture 214

(or biometric characteristics), and an authentication state 208 that corresponds to the gesture or biometric characteristics. In the illustrated example, the gesture 214 is an "unlock gesture" that is configured to transition the computing device 102 or applications 210 from a "locked state" to an "unlocked state".

Accordingly, based on this comparison the authentication module 122 may initiate an authentication state 208, which may include permitting or restricting access to computing device 102, application 210, or a remote device or application. The biometric characteristics or gestures may be detected using a variety of techniques, an example of which that includes use of RF signals is described in the following.

In some cases, the authentication module 122 is configured to initiate a first authentication state which permits the person to access a device or application if the person is recognized as the known person based on detected biometric characteristics of the person, and to initiate a second authentication state which restricts the person from accessing the device or application if the person is not recognized as the known person. In this way, the authentication component can authenticate the person without the person's active engagement.

As another example, the authentication module 122 can be configured to initiate a first authentication state which permits the person to access a device or application if the person is recognized as a first type of person (e.g., an adult) based on detected biometric characteristics of the person, and to initiate a second authentication state which restricts the person from accessing the device or application if the person is recognized as a second type of person (e.g., a child). For example, types or groups of people can be differentiated based on biometric characteristics such as height, weight, length or size of various body parts. For example, height may be usable to differentiate an adult from a young child.

In one or more implementations, the authentication module 122 is configured to determine the authentication state based on a two stage authentication process. For example, the authentication module can authenticate a person based on the person being recognized as a known person (based on biometric characteristics) as well as detecting a pre-configured authentication gesture performed by the person.

The 3D object detection system 120 represents functionality that wirelessly captures characteristics of a target object, illustrated here as a hand 216, but also including biometric characteristics of a person's body or a portion thereof. In this example, 3D object detection system 120 is a hardware component of the computing device 102. In some cases, 3D object detection system 120 not only captures characteristics about the hand 216, but can additionally identify a specific gesture performed by the hand 216 from other gestures. Any suitable type of characteristic or gesture can be captured or identified, such as an associated size of the hand, a directional movement of the hand, a micro-gesture performed by all or a portion of the hand (e.g., a single-tap gesture, a double-tap gesture, a left-swipe, a forward-swipe, a right-swipe, a finger making a shape, etc.), list of physical characteristics, and so forth. The term micro-gesture is used to signify a gesture that can be identified from other gestures based on differences in movement using a scale on the order of millimeters to sub-millimeters. Alternately or additionally, authentication component 104 can be configured to identify gestures on a larger scale than a micro-gesture (i.e., a macro-gesture that is identified by differences with a coarser resolution than a micro-gesture, such as differences measured in centimeters or meters).

Hand 216 of the person 124 represents a target object that the authentication component 104 is in process of detecting. Here, the hand 216 resides in free-space with no devices attached to it. Being in free-space, the hand 216 has no physical devices attached to it that couple to, or communicate with, computing device 102 and/or 3D object detection system 120. While this example is described in the context of detecting the hand 216, it is to be appreciated that 3D object detection system 120 can similarly be used to capture biometric characteristics of person 124, as well as characteristics of any other suitable type of target object, whether part or of separate from the person 124.

As part of this, the 3D object detection system 120 is configured to transmit and receive radio frequency (RF) signals. In an implementation, 3D object detection system 120 transmits the RF signals as radar signals, each on a respective antenna, that are directed towards hand 216 or the body of person 124. As the transmitted signals reach the hand 216 or body of person 124, at least some reflect back to 3D object detection system 120 and are processed, as further described below. Signals detected by the 3D object detection system 120 can have any suitable combination of energy level, carrier frequency, burst periodicity, pulse width, modulation type, waveform, phase relationship, and so forth. In some cases, some or all of the respective signals transmitted in signals differs from one another to create a specific diversity scheme, such as a time diversity scheme that transmits multiple versions of a same signal at different points in time, a frequency diversity scheme that transmits signals using several different frequency channels, a space diversity scheme that transmits signals over different propagation paths, and so forth.

Figure 3:
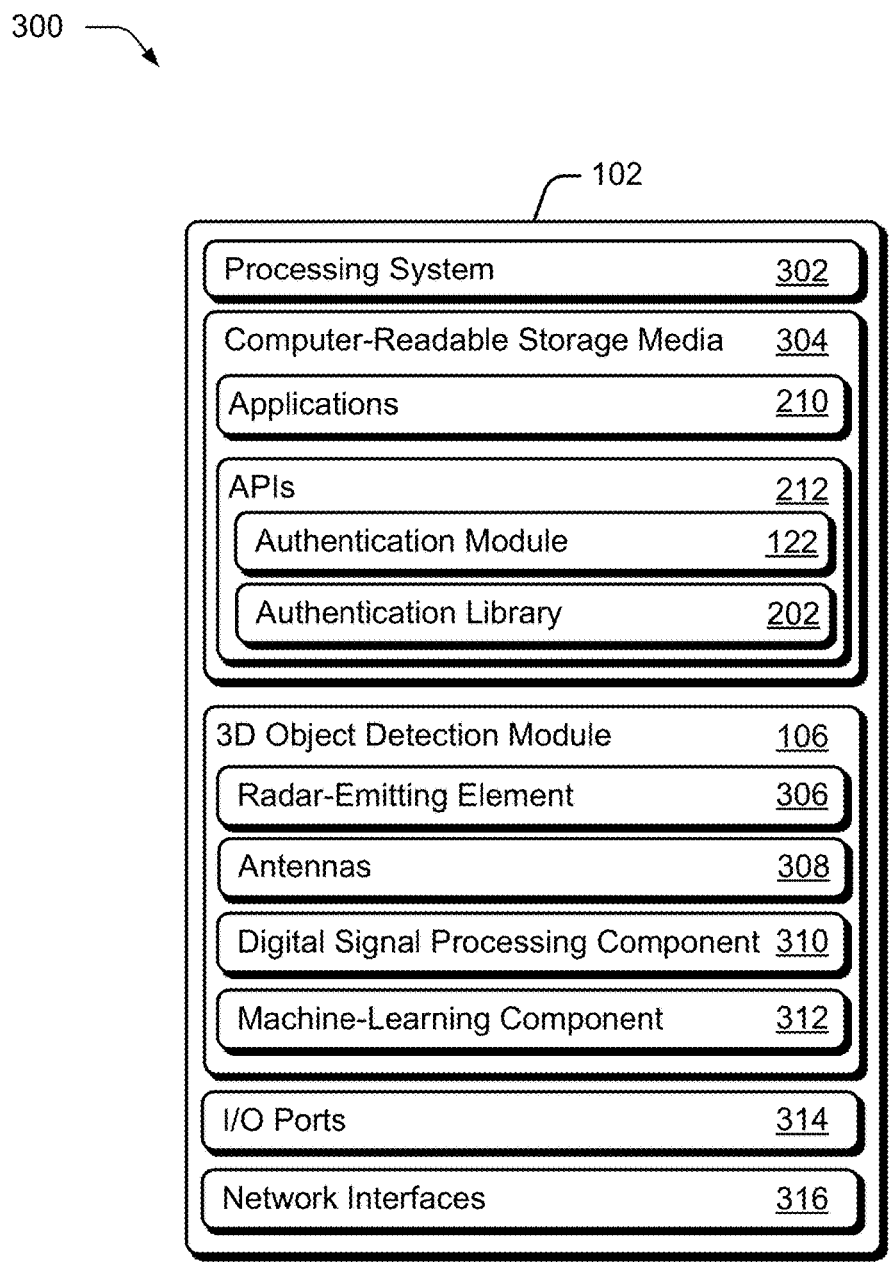
FIG. 3 illustrates an example implementation of the computing device of FIG. 1 in greater detail.

Having generally described an environment in which radar-based authentication may be implemented, now consider FIG. 3, which illustrates an example implementation 300 of computing device 102 of FIG. 1 in greater detail. Computing device 102 includes a processing system 302 (e.g., processors, CPUs, GPUs) and computer-readable storage media 304. Applications 210 (e.g., media consumption, browsers, third-party applications, and/or an operating system) are embodied as computer-readable instructions on the computer-readable storage media 304 and are executed by the processing system 302 to perform operations.

Computer-readable storage media 304 also includes the Application Programming Interfaces (APIs) 212 to provide programming access into various routines and tools provided by the authentication component 104 of FIGS. 1 and 2. In some implementations, APIs 212 provide high-level access into the authentication component 104 in order to abstract implementation details and/or hardware access from a calling application 210, request notifications related to identified events, query for results, and so forth. APIs 212 can also provide low-level access to authentication component 104, where a calling application 210 can control direct or partial hardware configuration of the authentication component 104. In some cases, APIs 212 provide programmatic access to input configuration parameters that configure transmit signals (e.g., signals as described in relation to FIG. 4) and/or select gesture recognition algorithms.

These APIs 212 enable applications 210 to incorporate the functionality provided by the authentication component 104 into executable code. For instance, applications 210 can call or invoke APIs 212 to register for, or request, an event notification when a particular gesture has been detected, enable or disable wireless gesture recognition in computing device 102, and so forth. At times, APIs 212 can access and/or include low level hardware drivers that interface with hardware implementations of authentication component 104. Alternately or additionally, APIs 212 can be used to access various algorithms that reside on authentication component 104 to perform additional functionality or extract additional information, such as 3D tracking information, angular extent, reflectivity profiles from different aspects, correlations between transforms/features from different channels, and so forth.

The 3D object detection system 120 and authentication module 122 of the authentication component 104 represent functionality that wirelessly detects a variety of gestures, such as gestures performed by a hand 216 of FIG. 2, as well as biometric characteristics of person 124. Authentication component 104 can be implemented as a chip embedded within computing device 102, e.g., as a single integrated circuit. However, it is to be appreciated that the authentication component 104 can be implemented in any other suitable manner, such as one or more Integrated Circuits (ICs), as a System-on-Chip (SoC), as a processor with embedded processor instructions or configured to access processor instructions stored in memory, as hardware with embedded firmware, a printed circuit board with various hardware components, or any combination thereof. Here, the 3D object detection system 120 includes radar-emitting element 306, antenna(s) 308, digital signal processing component 310, and machine-learning component 312, which can be used concert to wirelessly detect hand gestures using or biometric characteristics using radar techniques.

Generally, radar-emitting element 306 is configured to provide a radar field. In some cases, the radar field is configured to at least partially reflect off a target object. The radar field can also be configured to penetrate fabric or other obstructions and reflect from human tissue. These fabrics or obstructions can include wood, glass, plastic, cotton, wool, nylon and similar fibers, and so forth, while reflecting from human tissues, such as a person's hand or body.

A radar field can be a small size, such as 0 or 1 millimeters to 1.5 meters, or an intermediate size, such as 1 to 30 meters. It is to be appreciated that these sizes are merely for discussion purposes, and that any other suitable range can be used. When the radar field has an intermediate size, 3D object detection system 120 is configured to receive and process reflections of the radar field to provide large-body gestures based on reflections from human tissue caused by body, arm, or leg movements, as well as to detect biometric characteristics of a person's body. In other cases, the radar field can be configured to enable 3D object detection system 120 to detect smaller and more-precise gestures, such as micro-gestures. Example intermediate-sized radar fields include those in which a user makes gestures to control a television from a couch, change a song or volume from a stereo across a room, turn off an oven or oven timer (a near field would also be useful here), turn lights on or off in a room, and so forth. Radar-emitting element 306 can be configured to emit continuously modulated radiation, ultra-wideband radiation, or sub-millimeter-frequency radiation.

Antenna(s) 308 transmit and receive RF signals. In some cases, radar-emitting element 306 couples with antenna(s) 308 to transmit a radar field. As one skilled in the art will appreciate, this is achieved by converting electrical signals into electromagnetic waves for transmission, and vice versa for reception. Authentication component 104 can include any suitable number of antennas in any suitable configuration. For instance, any of the antennas can be configured as a dipole antenna, a parabolic antenna, a helical antenna, a monopole antenna, and so forth. In some embodiments, antennas 308 are constructed on-chip (e.g., as part of an SoC), while in other embodiments, antennas 308 are separate components, metal, hardware, etc. that attach to, or are included within, 3D object detection system 120. An antenna can be single-purpose (e.g., a first antenna can be directed towards transmitting signals, and a second antenna can be directed towards receiving signals), or multi-purpose (e.g., an antenna is directed towards transmitting and receiving signals). Thus, some embodiments utilized varying combinations of antennas, such as an embodiment that utilizes two single-purpose antennas directed towards transmission in combination with four single-purpose antennas directed towards reception. The placement, size, and/or shape of antennas 308 can be chosen to enhance a specific transmission pattern or diversity scheme, such as a pattern or scheme designed to capture information about a micro-gesture performed by the hand, as further described above and below. In some cases, the antennas can be physically separated from one another by a distance that allows authentication component 104 to collectively transmit and receive signals directed to a target object over different channels, different radio frequencies, and different distances. In some cases, antennas 308 are spatially distributed to support triangulation techniques, while in others the antennas are collocated to support beamforming techniques. While not illustrated, each antenna can correspond to a respective transceiver path that physically routes and manages the outgoing signals for transmission and the incoming signals for capture and analysis.

Digital signal processing component 310 generally represents digitally capturing and processing a signal. For instance, digital signal processing component 310 samples analog RF signals received by antenna(s) 308 to generate digital samples that represents the RF signals, and then processes these samples to extract information about the target object. Alternately or additionally, digital signal processing component 310 controls the configuration of signals generated and transmitted by radar-emitting element 306 and/or antennas 308, such as configuring a plurality of signals to form a specific diversity scheme like a beamforming diversity scheme. In some cases, digital signal processing component 310 receives input configuration parameters that control an RF signal's transmission parameters (e.g., frequency channel, power level, etc.), such as through APIs 212. In turn, digital signal processing component 310 modifies the RF signal based upon the input configuration parameter. At times, the signal processing functions of digital signal processing component 310 are included in a library of signal processing functions or algorithms that are also accessible and/or configurable via APIs 212, e.g., authentication library 202. Digital signal processing component 310 can be implemented in hardware, software, firmware, or any combination thereof.

Among other things, machine-learning component 312 receives information processed or extracted by digital signal processing component 310, and uses that information to classify or recognize various aspects of the target object. In some cases, machine-learning component 312 applies one or more algorithms to probabilistically determine biometric characteristics, or which gesture has occurred, given an input signal and previously learned gesture and biometric characteristics by leveraging the authentication library 202. As in the case of digital-signal processing component 310, machine-learning component 312 can include a library of multiple machine-learning algorithms, such as a Random Forrest algorithm, deep learning algorithms (i.e. artificial neural network algorithms, convolutional neural net algorithms, etc.), clustering algorithms, Bayesian algorithms, and so forth. Machine-learning component 312 can be trained on how to identify various gestures using input data that consists of example gesture(s) to learn. In turn, machine-learning component 312 uses the input data to learn what features can be attributed to a specific gesture. These features are then used to identify when the specific gesture occurs. In some embodiments, APIs 212 can be used to configure machine-learning component 312 and/or its corresponding algorithms.

Computing device 102 also includes I/O ports 314 and network interfaces 316. I/O ports 314 can include a variety of ports, such as by way of example and not limitation, high-definition multimedia (HDMI), digital video interface (DVI), display port, fiber-optic or light-based, audio ports (e.g., analog, optical, or digital), Universal Serial Bus (USB) ports, serial advanced technology attachment (SATA) ports, peripheral component interconnect (PCI) express based ports or card slots, serial ports, parallel ports, or other legacy ports. Computing device 102 may also include the network interfaces 316 for communicating data over wired, wireless, or optical networks. By way of example and not limitation, the network interfaces 316 may communicate data over a local-area-network (LAN), a wireless local-area-network (WLAN), a personal-area-network (PAN), a wide-area-network (WAN), an intranet, the Internet, a peer-to-peer network, point-to-point network, a mesh network, and the like.

As technology advances, users have an expectation that new devices will provide additional freedoms and flexibility over past devices. One such example is the inclusion of wireless capabilities in a device. Consider the case of a wireless mouse input device. A wireless mouse input device receives input from a user in the format of button clicks and movement in position, and wirelessly transmits this information to a corresponding computing device. The wireless nature obviates the need to have a wired connection between the wireless mouse input device and the computing device, which gives more freedom to the user with the mobility and placement of the mouse. However, the user still physically interacts with the wireless mouse input device as a way to enter input into the computing device. Accordingly, if the wireless mouse input device gets lost or is misplaced, the user is unable to enter input with that mechanism. Thus, removing the need for a peripheral device as an input mechanism gives additional freedom to the user. One such example is performing input to a computing device via a hand gesture.

Gestures provide a user with a simple and readily available mechanism to input commands to a computing device. However, detection of some gestures, such as hand gestures, can pose certain problems. For example, attaching a movement sensing device to a hand does not remove a user's dependency upon a peripheral device. Instead, it is a solution that simply trades one input peripheral for another. As an alternative, cameras can capture images, which can then be compared and analyzed to identify the hand gestures. However, this option may not yield a fine enough resolution to detect micro-gestures. An alternate solution involves usage of radar systems to transmit RF signals to a target object, and determine information about that target based upon an analysis of the reflected signal.

Various implementations described herein are used to wirelessly detect biometric characteristics or gestures using multiple antennas. Each antenna can be configured to transmit a respective RF signal to enable detection of biometric characteristics or a micro-gesture performed by a hand. In some embodiments, the collective transmitted RF signals are configured to radiate a specific transmission pattern or specific diversity scheme. RF signals reflected off of the hand or body of person 124 can be captured by the antenna, and further analyzed to identify temporal variations in the RF signals. In turn, these temporal variations can be used to identify biometric characteristics or gestures.

Figure 4:
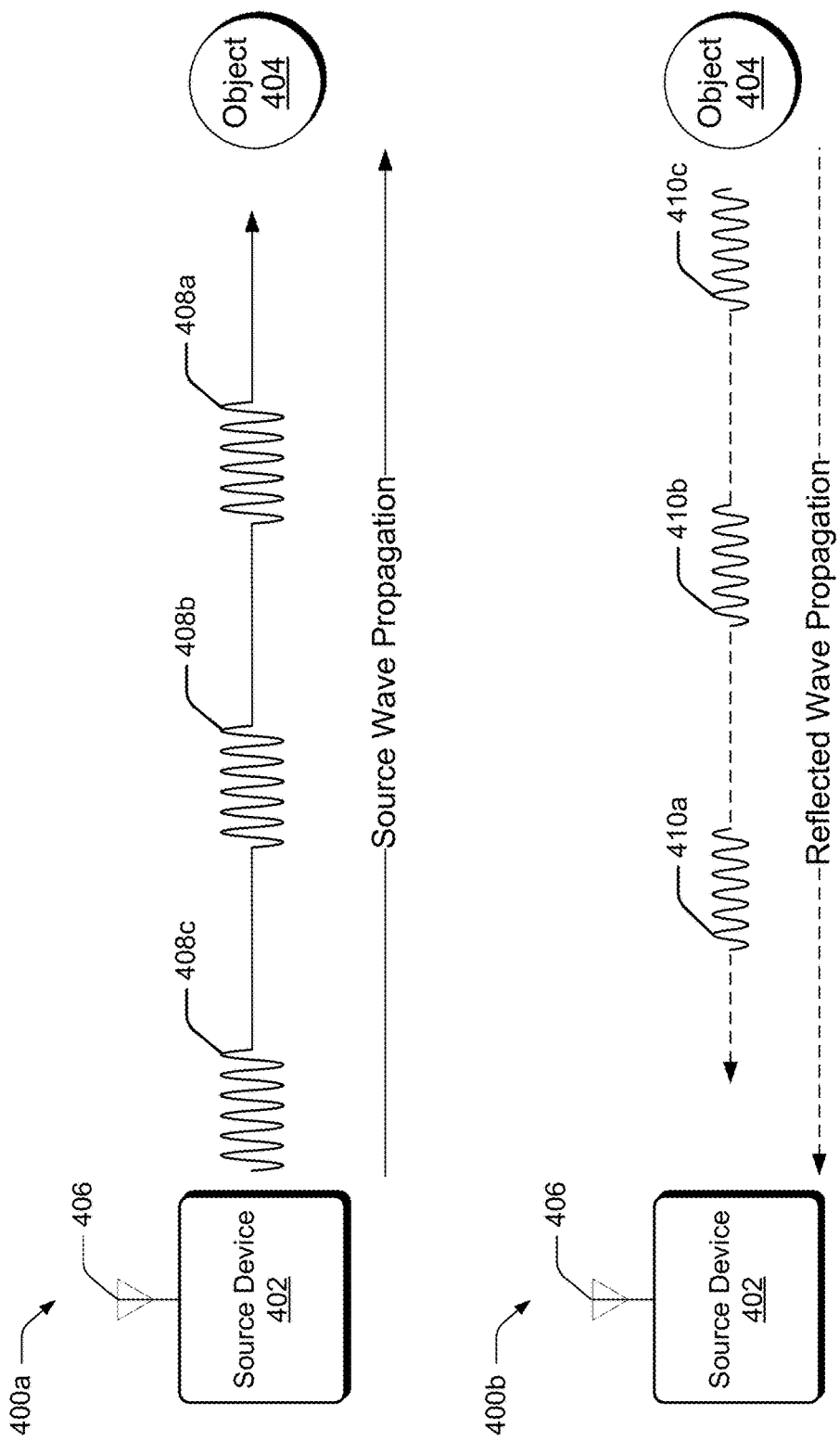
FIG. 4 illustrates an example of RF wave propagation, and a corresponding reflected wave propagation.

Consider FIG. 4 which illustrates an example of RF wave propagation, and a corresponding reflected wave propagation. It is to be appreciated that the following discussion has been simplified, and is not intended to describe all technical aspects of RF wave propagation, reflected wave propagation, or detection techniques.

Environment 400a includes source device 402 and object 404. Source device 402 includes antenna 406, which generally represents functionality configured to transmit and receive electromagnetic waves in the form of an RF signal. It is to be appreciated that antenna 406 can be coupled to a source, such as a radar-emitting element, to achieve transmission of a signal. In this example, source device 402 transmits a series of RF pulses, illustrated here as RF pulse 408a, RF pulse 408b, and RF pulse 408c. As indicated by their ordering and distance from source device 402, RF pulse 408a is transmitted first in time, followed by RF pulse 408b, and then RF pulse 408c. For discussion purposes, these RF pulses have the same pulse width, power level, and transmission periodicity between pulses, but any other suitable type of signal with alternate configurations can be transmitted without departing from the scope of the claimed subject matter.

Generally speaking, electromagnetic waves can be characterized by the frequency or wavelength of their corresponding oscillations. Being a form of electromagnetic radiation, RF signals adhere to various wave and particle properties, such as reflection. When an RF signal reaches an object, it will undergo some form of transition. Specifically, there will be some reflection off the object. Environment 400b illustrates the reflection of RF pulses 408a-408c reflecting off of object 404, where RF pulse 410a corresponds to a reflection originating from RF pulse 408a reflecting off of object 404, RF pulse 410b corresponds to a reflection originating from RF pulse 410b, and so forth. In this simple case, source device 402 and object 404 are stationary, and RF pulses 408a-408c are transmitted via a single antenna (antenna 406) over a same RF channel, and are transmitted directly towards object 404 with a perpendicular impact angle. Similarly, RF pulses 410a-410c are shown as reflecting directly back to source device 402, rather than with some angular deviation. However, as one skilled in the art will appreciate, these signals can alternately be transmitted or reflected with variations in their transmission and reflection directions based upon the configuration of source device 402, object 404, transmission parameters, variations in real-world factors, and so forth. Upon receiving and capturing RF pulses 410a-410c, source device 402 can then analyze the pulses, either individually or in combination, to identify characteristics related to object 404. For example, source device 402 can analyze all of the received RF pulses to obtain temporal information and/or spatial information about object 404. Accordingly, source device 402 can use knowledge about a transmission signal's configuration (such as pulse widths, spacing between pulses, pulse power levels, phase relationships, and so forth), and further analyze a reflected RF pulse to identify various characteristics about object 404, such as size, shape, movement speed, movement direction, surface smoothness, material composition, and so forth.

Figure 5:
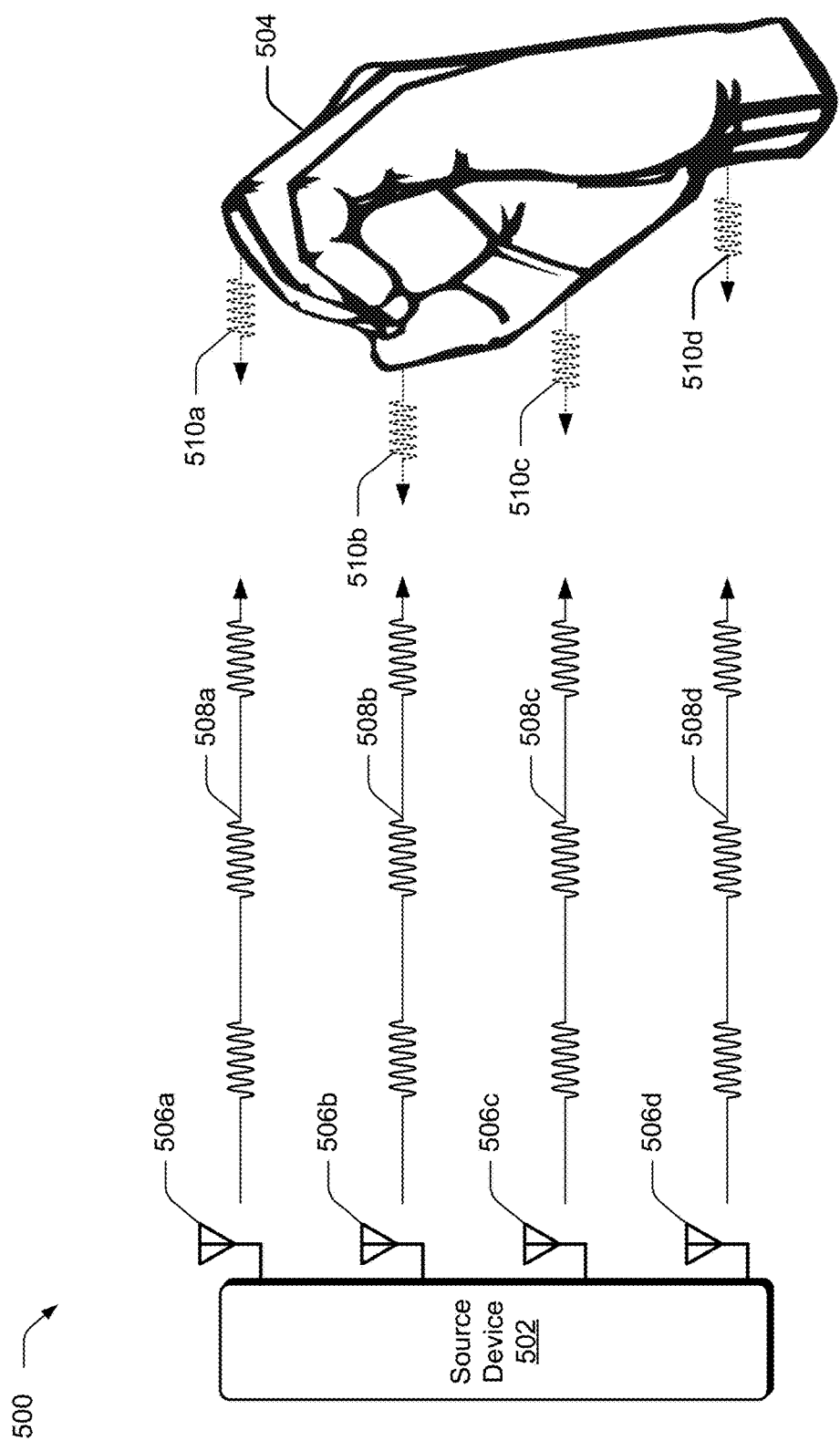
FIG. 5 illustrates an example environment in which multiple antenna are used to ascertain information about a target object.

Now consider FIG. 5, which builds upon the above discussion of FIG. 4. FIG. 5 illustrates example environment 500 in which multiple antenna are used to ascertain information about a target object. Environment 500 includes source device 502 and a target object, shown here as hand 504. Generally speaking, source device 502 includes antennas 506a-506d to transmit and receive multiple RF signals. In some embodiments, source device 502 includes authentication component 104, and antennas 506a-506d correspond to antennas 308. While source device 502 in this example includes four antennas, it is to be appreciated that any suitable number of antennas can be used. Each antenna of antennas 506a-506d is used by source device 502 to transmit a respective RF signal (e.g., antenna 506a transmits RF signal 508a, antenna 506b transmits RF signal 508b, and so forth). As discussed above, these RF signals can be configured to form a specific transmission pattern or diversity scheme when transmitted together. For example, the configuration of RF signals 508a-508d, as well as the placement of antennas 506a-506d relative to a target object, can be based upon beamforming techniques to produce constructive interference or destructive interference patterns, or alternately configured to support triangulation techniques. At times, source device 502 configures RF signals 508a-508d based upon an expected information extraction algorithm, as further described below.

When RF signals 508a-508d reach hand 504, they generate reflected RF signals 510a-510d. Similar to the discussion of FIG. 4 above, source device 502 captures these reflected RF signals, and then analyzes them to identify various properties or characteristics of hand 504, such as a micro-gesture. For instance, in this example, RF signals 508a-508d are illustrated with the bursts of the respective signals being transmitted synchronously in time. In turn, and based upon the shape and positioning of hand 504, reflected signals 510a-510d return to source device 502 at different points in time (e.g., reflected signal 510b is received first, followed by reflected signal 510c, then reflected signal 510a, and then reflected signal 510d). Reflected signals 510a-510d can be received by source device 502 in any suitable manner. For example, antennas 506a-506d can each receive all of reflected signals 510a-510d, or receive varying subset combinations of reflected signals 510a-510d (i.e. antenna 506a receives reflected signal 510a and reflected signal 510d, antenna 506b receives reflected signal 510a, reflected signal 510b, and reflected signal 510c, etc.). Thus, each antenna can receive reflected signals generated by transmissions from another antenna. By analyzing the various return times of each reflected signal, source device 502 can determine shape and corresponding distance information associated with hand 504. When reflected pulses are analyzed over time, source device 502 can additionally discern movement. Thus, by analyzing various properties of the reflected signals, as well as the transmitted signals, various information about hand 504 can be extracted, as further described below. It is to be appreciated that the above example has been simplified for discussion purposes, and is not intended to be limiting.

As in the case of FIG. 5, FIG. 5 illustrates RF signals 508a-508d as propagating at a 90° angle from source device 502 and in phase with one another. Similarly, reflected signals 510a-510d each propagate back at a 90° angle from hand 504 and, in the case of RF signals 508a-508d, are in phase with one another. However, as one skilled in the art will appreciate, more complex transmission signal configurations, and signal analysis on the reflected signals, can be utilized, examples of which are provided above and below. In some embodiments, RF signals 508a-508d can each be configured with different directional transmission angles, signal phases, power levels, modulation schemes, RF transmission channels, and so forth. These differences result in variations between reflected signals 510a-510d. In turn, these variations each provide different perspectives of the target object which can be combined using data fusion techniques to yield a better estimate of hand 504, how it is moving, its 3-dimentional (3D) spatial profile, a corresponding micro-gesture, etc.

Figure 6:
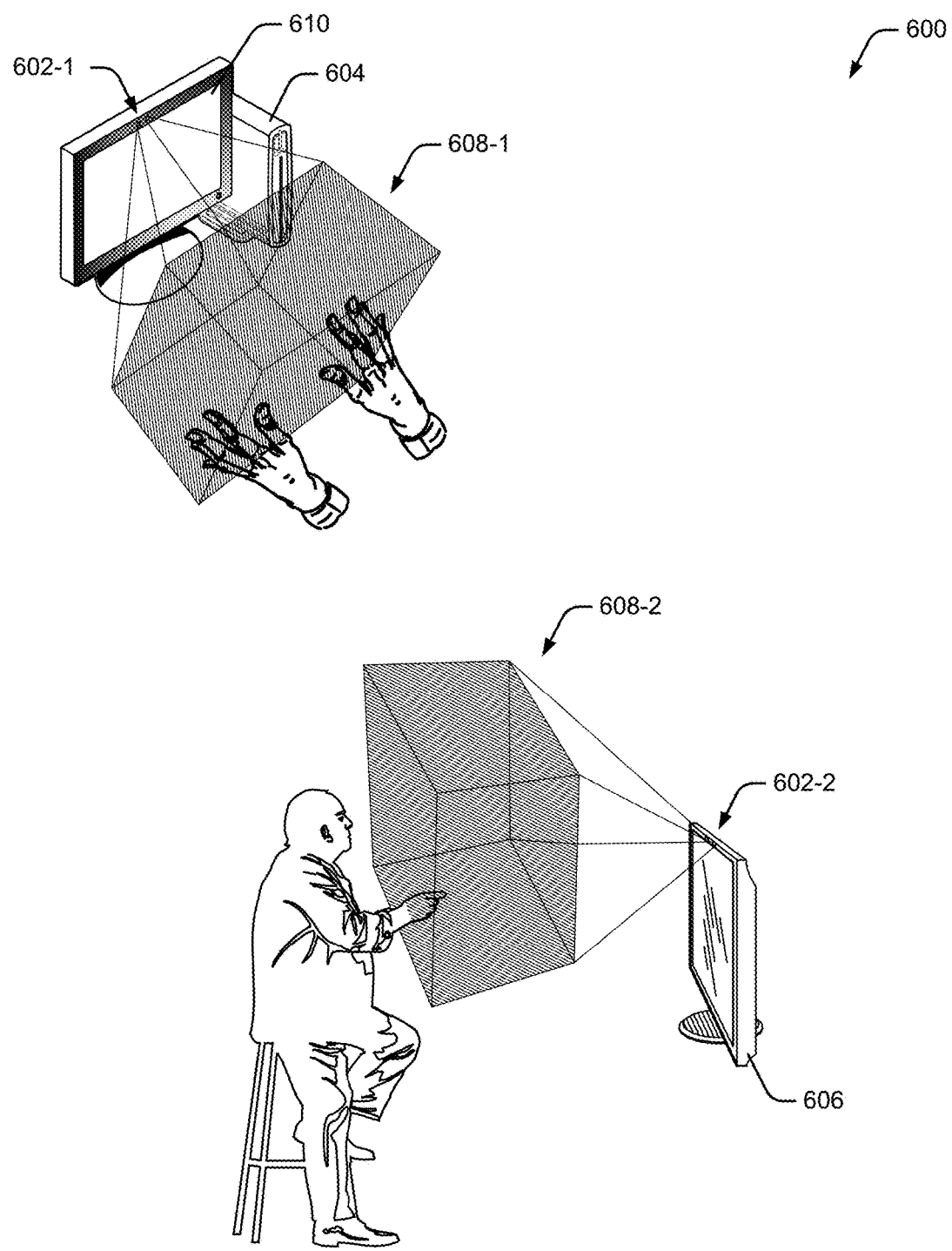
FIG. 6 illustrates an example environment in which techniques using, and an apparatus including, a 3D object detection system may be embodied.

Building further upon the discussions with respect to FIGS. 4 and 5, now consider FIG. 6. FIG. 6 illustrates an example environment 600 in which techniques using, and an apparatus including, a 3D object detection system may be embodied, such as 3D object detection system 120 of FIG. 1. Environment 600 includes two example devices using a 3D object detection system. In the first, 3D object detection system 602-1 provides a near radar field to interact with desktop computer 604, and in the second, 3D object detection system 602-2 provides an intermediate radar field (e.g., a room size) to interact with television 606. These 3D object detection systems 602-1 and 602-2 provide radar field 608-1 and intermediate radar field 608-2, respectively, and are described below.

Desktop computer 604 includes, or is associated with, 3D object detection system 602-1. These devices work together to improve user interaction with desktop computer 604. Assume, for example, that desktop computer 604 includes a touch screen 610 through which display and user interaction can be performed. This touch screen 610 can present some challenges to users, such as needing a person to sit in a particular orientation, such as upright and forward, to be able to touch the screen. Further, the size for selecting controls through touch screen 610 can make interaction difficult and time-consuming for some users. Consider, however, 3D object detection system 602-1, which provides near radar field 608-1 enabling a user's hands to interact with desktop computer 604, such as with small or large, simple or complex gestures, including those with one or two hands, and in three dimensions. As is readily apparent, a large volume through which a user may make selections can be substantially easier and provide a better experience over a flat surface, such as that of touch screen 610.

Similarly, consider 3D object detection system 602-2, which provides intermediate radar field 608-2. Providing a radar-field enables a user to interact with television 606 from a distance and through various gestures, ranging from hand gestures, to arm gestures, to full-body gestures. By so doing, user selections can be made simpler and easier than a flat surface (e.g., touch screen 610), a remote control (e.g., a gaming or television remote), and other conventional control mechanisms.

3D object detection systems can interact with applications or an operating system of computing devices, or remotely through a communication network by transmitting input responsive to recognizing gestures. Gestures can be mapped to various applications and devices, thereby enabling control of many devices and applications. Many complex and unique gestures can be recognized by radar-based gesture recognition systems, thereby permitting precise and/or single-gesture control, even for multiple applications. Radar-based gesture recognition systems, whether integrated with a computing device, having computing capabilities, or having few computing abilities, can each be used to interact with various devices and applications.

Figure 7:
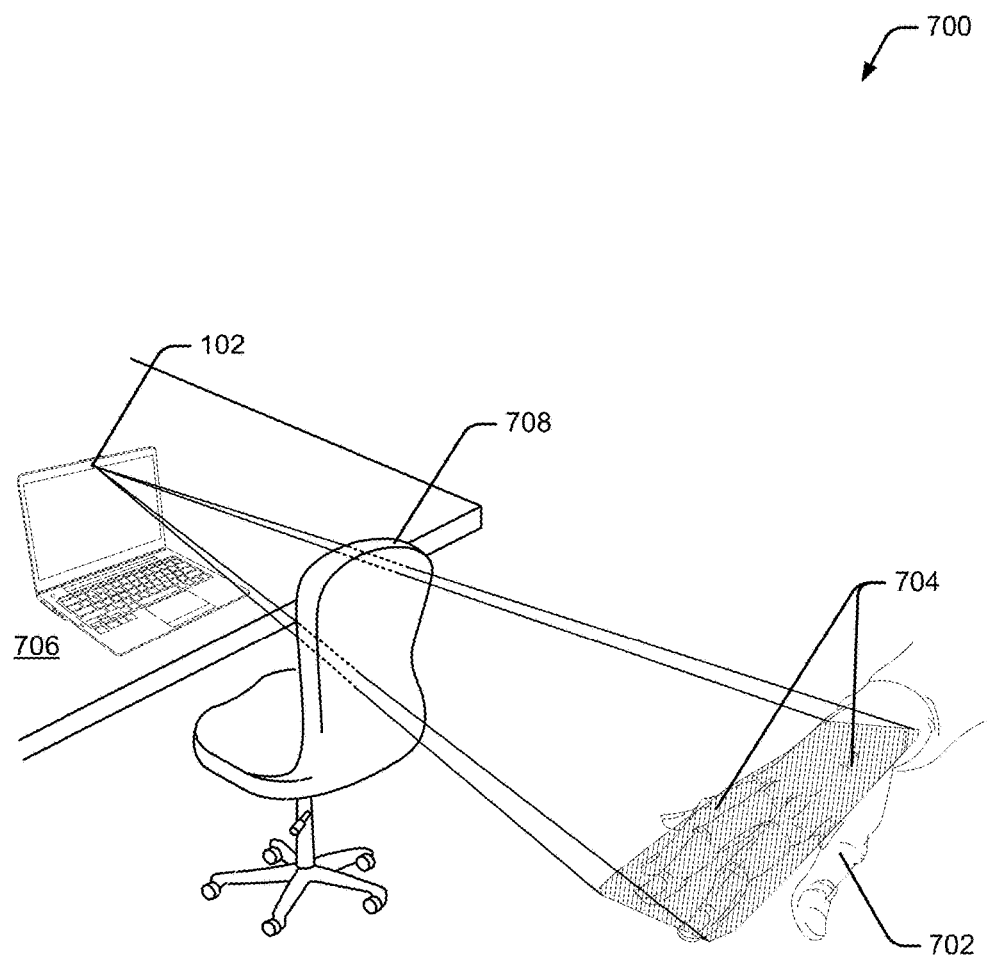
FIG. 7 illustrates an additional example environment in which techniques using, and an apparatus including, a 3D object detection system may be embodied.

The radar field can also include a surface applied to human tissue. Consider, for example, FIG. 7, which illustrates an additional example environment 700 in which techniques using, and an apparatus including, a 3D object detection system may be embodied, such as 3D object detection system 120 of FIG. 1.

Example 700 includes a hand 702 and a surface radar field 704 provided by 3D object detection system 120 that is included in a laptop 706. Radar-emitting element 306 (not shown) provides surface radar field 704 penetrating chair 708 and applied to hand 702. In this case, antenna 308 (not shown) is configured to receive a reflection caused by an interaction on the surface of hand 702 that penetrates (e.g., reflects back through) chair 708. Similarly, digital signal processing component 310 and/or machine-learning component 312 are configured to process the received reflection on the surface sufficient to provide gesture data usable to determine a gesture and/or biometric data usable to determine biometric characteristics usable to identify a person. Note that with surface radar field 704, another hand may interact to perform gestures, such as to tap on the surface on hand 702, thereby interacting with surface radar field 704. Example gestures include single and multi-finger swipe, spread, squeeze, non-linear movements, and so forth. Or hand 702 may simply move or change shape to cause reflections, thereby also performing an occluded gesture.

With respect to human-tissue reflection, reflecting radar fields can process these fields to determine identifying indicia based on the human-tissue reflection, and confirm that the identifying indicia matches recorded identifying indicia for a person, such that the person may be authenticated. These identifying indicia can include various biometric identifiers, such as a size, shape, ratio of sizes, cartilage structure, and bone structure for the person or a portion of the person, such as the person's hand. These identify indicia may also be associated with a device worn by the person permitted to control the mobile computing device, such as device having a unique or difficult-to-copy reflection (e.g., a wedding ring of 14 carat gold and three diamonds, which reflects radar in a particular manner). In addition, radar-based gesture detection systems can be configured so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 8:
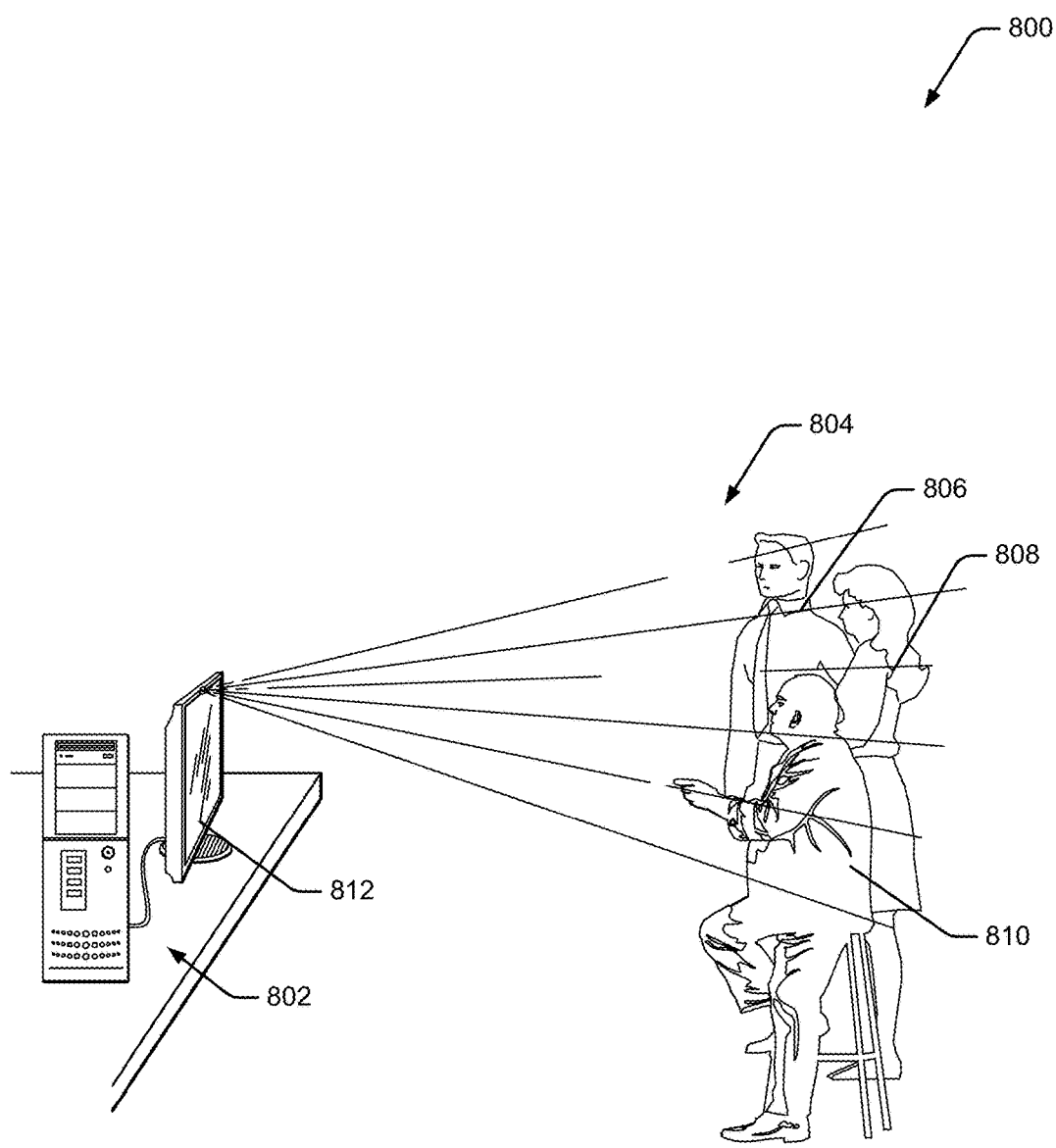
FIG. 8 illustrates an additional example environment in which techniques using, and an apparatus including, a 3D object detection system may be embodied.

By way of further example, consider FIG. 8, illustrates an additional example environment 800 in which techniques using, and an apparatus including, a 3D object detection system may be embodied, such as 3D object detection system 120 of FIG. 1.

Example 800 includes a computing device 802, a radar field 804, and three persons, 806, 808, and 810. The 3D object detection system 120 can detect characteristics about each of person's 806, 808, and 810, such as his height, weight, skeletal structure, facial shape and hair (or lack thereof). By so doing, 3D object detection system 120 may determine, for example, that person 810 is a particular known person, a particular type of person (e.g., an adult to differentiate person 810 from a child, or a man to differentiate person 810 from person 808 who is a woman), or simply identify person 810 to differentiate him from the other persons in the room (persons 806 and 808). Furthermore, in order to identify the person 810, the person may do little if anything explicitly, though explicit interaction is also permitted. For example, 810 may simply walk in and sit down on a stool and by so doing walks into radar field 804 which then automatically detects biometric characteristics of the person 810. For example, the 3D object detection system 120 senses this interaction based on received reflections from person 810.

Example Procedures

Figure 9:
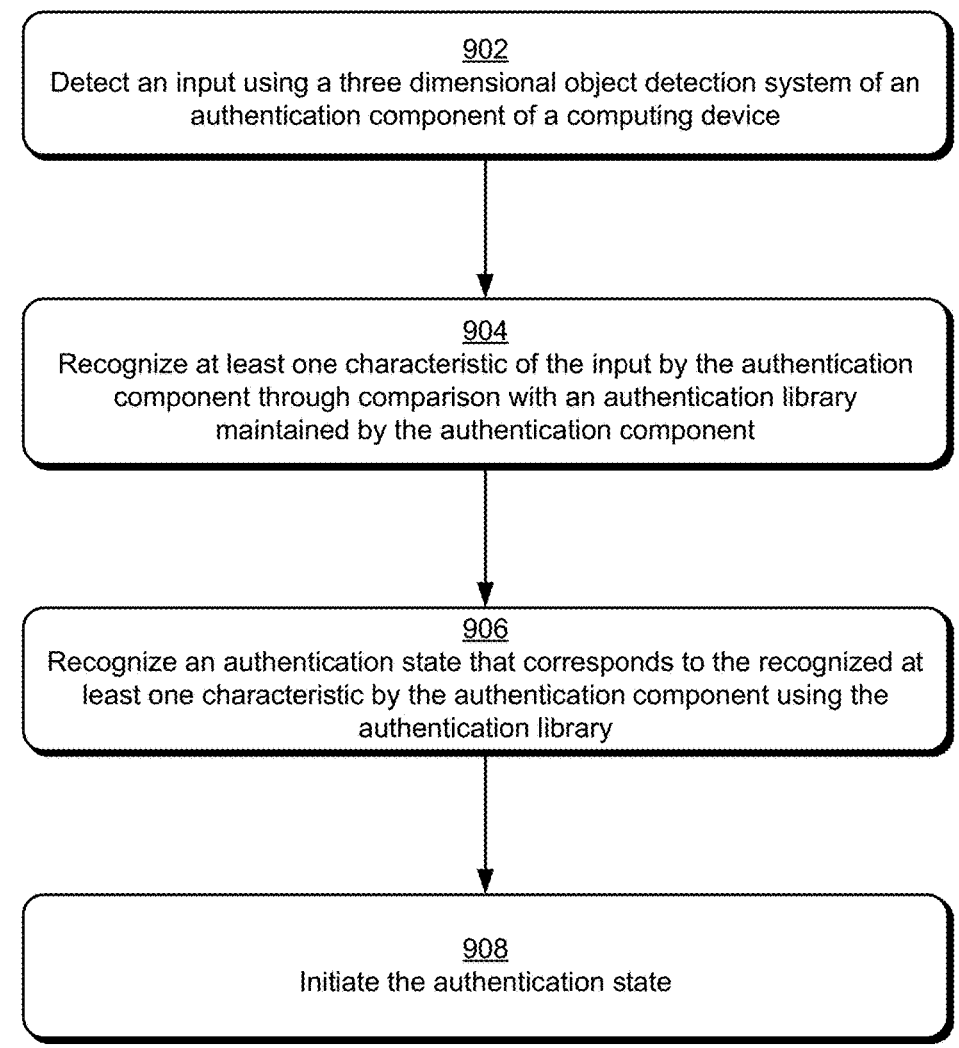
FIG. 9 is a flow diagram depicting a procedure in an example implementation.

FIG. 9 is a flow diagram depicting a procedure 900 in an example implementation. The following discussion describes techniques that may be implemented utilizing the previously described systems and devices. Aspects of each of the procedure may be implemented in hardware, firmware, software, or a combination thereof. The procedure is shown as a set of blocks that specify operations performed by one or more devices and are not necessarily limited to the orders shown for performing the operations by the respective blocks.

An input is detected using a three dimensional object detection system of an authentication component of a computing device (block 902). The input may detect an object, such as a person 124 (or a part of a person 124), a physical object associated with a person 124, as well as objects in a physical environment, in which, the person 124 is disposed.

At least one characteristic is recognized by the authentication component based on the detected input through comparison with an authentication library maintained by the gesture component (block 904). An authentication module 122, for instance, may compare the input from the 3D object detection system 120 with an authentication library 202 to determine a gesture 206 which corresponds with the input, if any. Alternately or additionally, the authentication module 122 may compare the input from the 3D object detection system 120 with an authentication library 202 to identify biometric characteristics 204 associated with a known person or a type of person.

An authentication state is then recognized that corresponds to the recognized at least one characteristic by the authentication component using the authentication library (block 906). The biometric characteristics 204 or gesture 206, for instance, may be associated with a corresponding authentication state 208 within the authentication library 202.

The recognized authentication state is then initiated by the authentication component (block 910). Continuing with the above example, this may include causing a device or application to transition to the authentication state, thereby enabling or restricting access to the device or application.

Example Electronic Device

Figure 10:
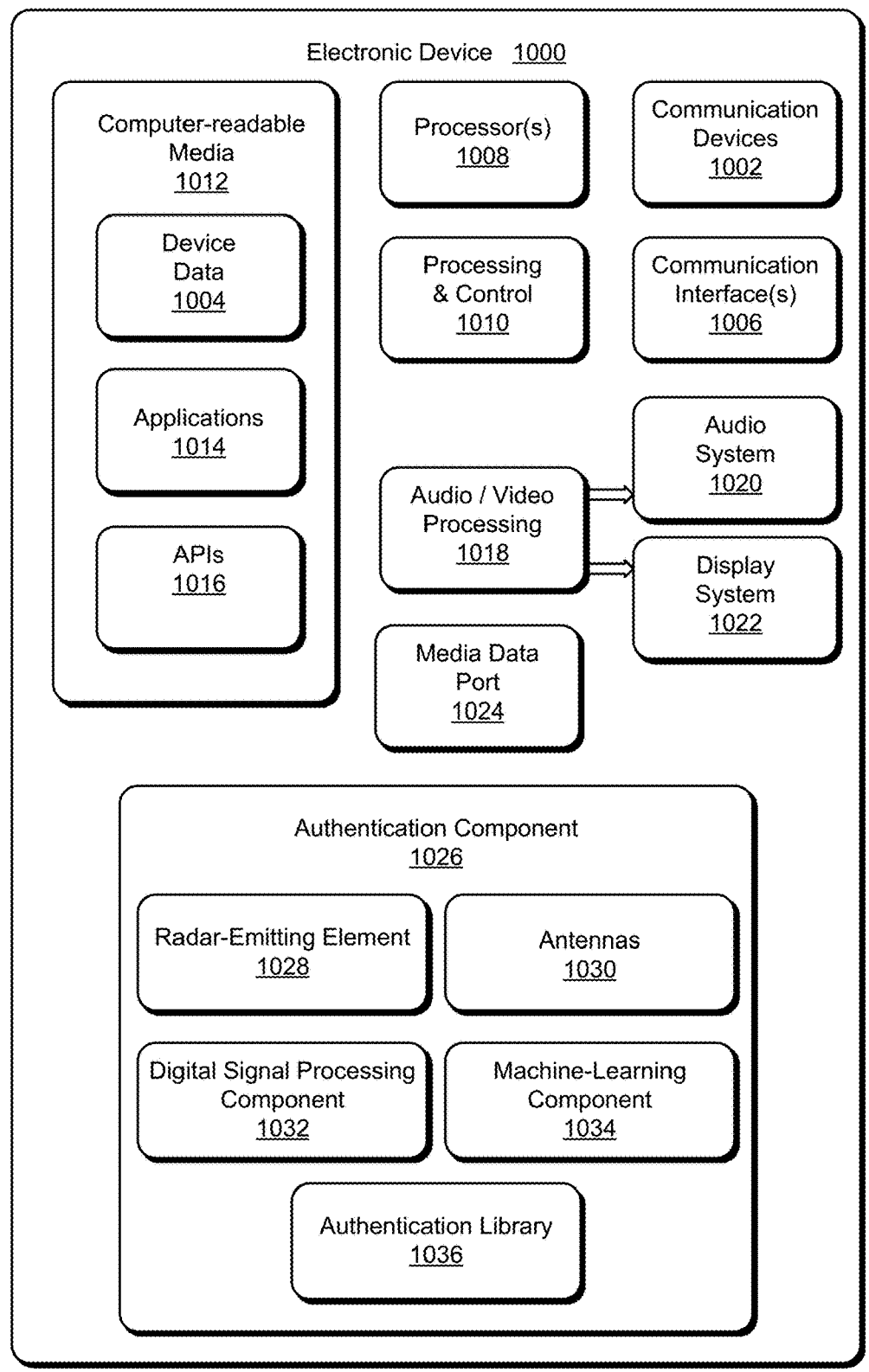
FIG. 10 illustrates various components of an example electronic device 1000 that incorporates radar-based authentication techniques as described with reference to FIGS. 1-9.

FIG. 10 illustrates various components of an example electronic device 1000 that incorporates radar-based authentication techniques as described with reference to FIGS. 1-9. Electronic device 1000 may be implemented as any type of a fixed or mobile device, in any form of a consumer, computer, portable, user, communication, phone, navigation, gaming, audio, camera, messaging, media playback, and/or other type of electronic device, such as computing device 102. In light of this, it is to be appreciated that various alternate embodiments can include additional components that are not described, or exclude components that are described, with respect to electronic device 1000.

Electronic device 1000 includes communication devices 1002 that enable wired and/or wireless communication of device data 1004 (e.g., received data, data that is being received, data scheduled for broadcast, data packets of the data, etc.). The device data 1004 or other device content can include configuration settings of the device and/or information associated with a user of the device.

Electronic device 1000 also includes communication interfaces 1006 that can be implemented as any one or more of a serial and/or parallel interface, a wireless interface, any type of network interface, a modem, and as any other type of communication interface. The communication interfaces 1006 provide a connection and/or communication links between electronic device 1000 and a communication network by which other electronic, computing, and communication devices communicate data with electronic device 1000.

Electronic device 1000 includes one or more processors 1008 (e.g., any of microprocessors, controllers, and the like) which process various computer-executable instructions to control the operation of electronic device 1000 and to implement embodiments of the techniques described herein. Alternatively or in addition, electronic device 1000 can be implemented with any one or combination of hardware, firmware, or fixed logic circuitry that is implemented in connection with processing and control circuits which are generally identified at 1010. Although not shown, electronic device 1000 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Electronic device 1000 also includes computer-readable media 1012, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like.

Computer-readable media 1012 provides data storage mechanisms to store the device data 1004, as well as various applications 1014 and any other types of information and/or data related to operational aspects of electronic device 1000. The applications 1014 can include a device manager (e.g., a control application, software application, signal processing and control module, code that is native to a particular device, a hardware abstraction layer for a particular device, etc.). Computer-readable media 1012 also includes APIs 1016.

APIs 1016 provide programmatic access to an authentication component, examples of which are provided above. The programmatic access can range from high-level program access that obscures underlying details of how a function is implemented, to low-level programmatic access that enables access to hardware. In some cases, APIs can be used to send input configuration parameters associated with modifying how signals are transmitted, received, and/or processed by an authentication component.

Electronic device 1000 also includes audio and/or video processing system 1018 that processes audio data and/or passes through the audio and video data to audio system 1020 and/or to display system 1022 (e.g., a screen of a smart phone or camera). Audio system 1020 and/or display system 1022 may include any devices that process, display, and/or otherwise render audio, video, display, and/or image data. Display data and audio signals can be communicated to an audio component and/or to a display component via an RF link, S-video link, HDMI, composite video link, component video link, DVI, analog audio connection, or other similar communication link, such as media data port 1024. In some implementations, audio system 1020 and/or display system 1022 are external components to electronic device 1000. Alternatively or additionally, display system 1022 can be an integrated component of the example electronic device, such as part of an integrated touch interface.

Electronic device 1000 also includes authentication component 1026 that wirelessly identifies one or more features of a target object, such as a micro-gesture performed by a hand as further described above. Authentication component 1026 can be implemented as any suitable combination of hardware, software, firmware, and so forth. In some embodiments, authentication component 1026 is implemented as an SoC. Among other things, authentication component 1026 includes radar-emitting element 1028, antennas 1030, digital signal processing component 1032, machine-learning component 1034, and gesture library 1036.

Radar-emitting element 1028 is configured to provide a radar field. In some cases, the radar field is configured to at least partially reflect off a target object. The radar field can also be configured to penetrate fabric or other obstructions and reflect from human tissue. These fabrics or obstructions can include wood, glass, plastic, cotton, wool, nylon and similar fibers, and so forth, while reflecting from human tissues, such as a person's hand Radar-emitting element 1028 works in concert with antennas 1030 to provide the radar field.

Antenna(s) 1030 transmit and receive RF signals under the control of authentication component 1026. Each respective antenna of antennas 1030 can correspond to a respective transceiver path internal to authentication component 1026 that physical routes and manages outgoing signals for transmission and the incoming signals for capture and analysis as further described above.

Digital signal processing component 1032 digitally processes RF signals received via antennas 1030 to extract information about the target object. This can be high-level information that simply identifies a target object, or lower level information that identifies a particular micro-gesture performed by a hand. In some embodiments, digital signal processing component 1032 additionally configures outgoing RF signals for transmission on antennas 1030. Some of the information extracted by digital signal processing component 1032 is used by machine-learning component 1034. Digital signal processing component 1032 at times includes multiple digital signal processing algorithms that can be selected or deselected for an analysis, examples of which are provided above. Thus, digital signal processing component 1032 can generate key information from RF signals that can be used to determine what gesture might be occurring at any given moment. At times, an application, such those illustrated by applications 1014, can configure the operating behavior of digital signal processing component 1032 via APIs 1016.

Machine-learning component 1034 receives input data, such as a transformed raw signal or high-level information about a target object, and analyzes the input date to identify or classify various features contained within the data. As in the case above, machine-learning component 1034 can include multiple machine-learning algorithms that can be selected or deselected for an analysis. Among other things, machine-learning component 1034 can use the key information generated by digital signal processing component 1032 to detect relationships and/or correlations between the generated key information and previously learned gestures to probabilistically decide which gesture is being performed. At times, an application, such those illustrated by applications 1014, can configure the operating behavior of machine-learning component 1032 via APIs 1016.

Authentication library 1036 represents data used by authentication component 1026 to identify a target object and/or gestures performed by the target object. For instance, authentication library 202 can store signal characteristics, or characteristics about a target object that are discernable from a signal, that can be used to identify a unique in-the-air gesture, biometric characteristics, a user identity, user presence, and so forth. In addition, certain data stored in authentication library 1036 may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Although the embodiments have been described in language specific to structural features and/or methodological acts, it is to be understood that the various embodiments defined in the appended claims are not necessarily limited to the specific features or acts described. Rather, the specific features and acts are disclosed as example forms of implementing the various embodiments.

What is claimed is:

1. An authentication module implemented at least partially in hardware of a computing device and configured to initiate one or more authentication states based on biometric characteristics by performing operations comprising:

initiating transmission of outgoing frequency-modulated continuous-wave (FMCW) radio frequency (RF) radar signals via a plurality of transmitting antennas of the computing device using beamforming techniques, the transmitting antennas collocated to enable the beamforming techniques such that a radiation pattern generated by the transmitting antennas comprises constructive interference and destructive interference;

receiving, via a plurality of receiving antennas of the computing device that are separate from the transmitting antennas, incoming RF signals generated by the outgoing FMCW RF radar signals reflecting off a person, a number of the receiving antennas greater than or equal to a number of the transmission antennas;

analyzing the incoming RF signals to determine a spatial representation of the person;

comparing the spatial representation of the person with stored biometric characteristics in an authentication library to recognize the person as a known person or a known type of person; and determining an authentication state associated with the known person or known type of person from the authentication library.

2. The authentication module of claim 1, wherein the authentication state enables or restricts access to the computing device, an application executing on the computing device, or a remote device.

3. The authentication module of claim 1, wherein the operations further comprise:

initiating a first authentication state which permits the person to access the computing device or an application executing on the computing device if the person is recognized as the known person; and initiating a second authentication state which restricts the person from accessing the computing device or the application if the person is not recognized as the known person.

4. The authentication module of claim 1, wherein the operations further comprise:

initiating a first authentication state which permits the person to access the computing device or an application executing on the computing device if the person is recognized as a first type of person; and initiating a second authentication state which restricts the person from accessing the computing device or the application if the person is recognized as a second type of person.

5. The authentication module of claim 4, wherein one of the first type of person or the second type of person corresponds to an adult and the other of the first type of person or the second type of person corresponds to a child.

6. The authentication module of claim 1, wherein the stored biometric characteristics comprise at least one of a height or a skeletal structure associated with the known person or type of person.

7. The authentication module of claim 1, wherein the stored biometric characteristics comprise a walking gait of the known person.

8. The authentication module of claim 1, wherein the spatial representation of the person is detected based on the incoming RF signals having been reflected off bone tissue of the person, and wherein the spatial representation of the person comprises a skeletal structure or walking gait of the person.

9. The authentication module of claim 1, wherein the operations further comprise:

receiving, via the receiving antennas, additional incoming RF signals generated by additional outgoing FMCW RF radar signals reflecting off one or more gestures performed by the person;

analyzing the additional incoming RF signals to determine one or more characteristics of the one or more gestures performed by the person;

comparing the one or more characteristics of the one or more gestures with stored gesture in the authentication library to recognize the one or more gestures as a pre-configured authentication gesture; and wherein the authentication module determines the authentication state based at least in part on the one or more gestures being recognized as the pre-configured authentication gesture.

10. The authentication module of claim 1, wherein:

the transmitting antennas comprise two transmitting antennas for transmitting the FMCW RF radar signals; and the receiving antennas comprise four antennas for receiving the incoming RF signals.

11. A method of determining an authentication state performed by a computing device, the method comprising:

transmitting, by the computing device and via transmitting antennas of the computing device using beamforming techniques, a plurality of outgoing frequency-modulated continuous-wave (FMCW) radio frequency (RF) radar signals, the transmitting antennas collocated to enable the beamforming such that a radiation pattern generated by the transmitting antennas comprises constructive interference and destructive interference;

capturing, by the computing device and via a plurality of receiving antennas of the computing device that are separate from the transmitting antennas, incoming RF signals generated by the plurality of outgoing FMCW RF radar signals reflecting off a person, a number of the receiving antennas being greater than or equal to a number of the transmitting antennas;

determining, by the computing device, a spatial representation of the person from the captured incoming RF signals;

comparing, by the computing device, the spatial representation of the person to an authentication library;

recognizing, by the computing device, an authentication state corresponding to the spatial representation of the person using the authentication library; and initiating, by the computing device, the recognized authentication state.

12. The method of claim 11, wherein the authentication state enables or restricts access to the computing device, an application executing on the computing device, or a remote device.

13. The method of claim 11, wherein the spatial representation of the person comprises at least one biometric characteristic of the person.

14. The method of claim 13, wherein the at least one biometric characteristic of the person is recognized without the person's active engagement with the computing device.

15. The method of claim 11, wherein the spatial representation of the person comprises at least one gesture performed by a person.

16. The method of claim 11, wherein the FMCW RF radar signals and the incoming RF signals correspond to a frequency band included as part of a Wi-Fi radio spectrum.

17. The method of claim 11, wherein:
the transmitting antennas comprise two transmitting antennas for transmitting the FMCW RF radar signals; and
the receiving antennas comprise four antennas for receiving the incoming RF signals.

18. A computing device comprising:
a processing system;
an authentication component implemented at least partially in hardware, the authentication component including:
a three-dimensional object detection system configured to detect an input involving orientation or movement of an object in three-dimensional space, the three-dimensional object detection system comprising:
a radio frequency (RF) transmitter configured to transmit frequency-modulated continuous-wave (FMCW) RF radar signals via a plurality of transmitting antennas of the computing device using beamforming techniques, the transmitting antennas collocated to enable the beamforming such that a radiation pattern generated by the transmitting comprises constructive interference and destructive interference;
an RF receiver configured to receive incoming RF signals via a plurality of receiving antennas of the computing device that are separate from the transmitting antennas, a number of the receiving antennas being greater than or equal to a number of the transmitting antennas, and the incoming RF signals generated by the plurality of outgoing FMCW RF radar signals reflecting off the object; and
a radar processing module configured to determine the orientation or movement of the object from the received incoming RF signals; and
an authentication module configured to:
compare the orientation or movement of the object to an authentication library;
recognize an authentication state corresponding to the orientation or movement of the object using the authentication library; and
initiate the recognized authentication state.

19. The computing device of claim 18, wherein:
the transmitting antennas comprise two transmitting antennas for transmitting the FMCW RF radar signals; and
the receiving antennas comprise four antennas for receiving the incoming RF signals.

20. The computing device of claim 18, wherein:
the object comprises a human; and
the orientation or movement of the object corresponds to a walking gait of the human.

* * * * *

UNITED STATES PATENT AND TRADEMARK OFFICE
CERTIFICATE OF CORRECTION

PATENT NO. : 10,503,883 B1
APPLICATION NO. : 15/287308
DATED : December 10, 2019
INVENTOR(S) : Nicholas Edward Gillian, Ivan Poupyrev and Carsten C. Schwesig Page 1 of 1

It is certified that error appears in the above-identified patent and that said Letters Patent is hereby corrected as shown below:

In the Claims

Column 19, Line 48, after "antennas" before "greater" insert --being--

Column 20, Lines 60 and 61, after "via" before "transmitting" insert --at least two--

Signed and Sealed this
Twenty-eighth Day of January, 2020

Andrei Iancu
*Director of the United States Patent and Trademark Office*